United States Patent [19]

Yanagi et al.

[11] Patent Number: 5,077,719
[45] Date of Patent: Dec. 31, 1991

[54] OPTICAL DISK ACCESS SYSTEM

[75] Inventors: Shigenori Yanagi, Kawasaki; Masateru Sasaki; Akira Minami, both of Yokohama; Toshitaka Iwamoto; Shigeyoshi Tanaka, both of Kawasaki, all of Japan

[73] Assignee: Fujitsu Limited, Kawasaki, Japan

[21] Appl. No.: 235,496

[22] Filed: Aug. 24, 1988

[30] Foreign Application Priority Data

| Aug. 28, 1987 | [JP] | Japan | 62-214555 |
| Jan. 19, 1988 | [JP] | Japan | 63-008798 |
| Jan. 22, 1988 | [JP] | Japan | 63-012314 |
| Apr. 11, 1988 | [JP] | Japan | 63-088684 |

[51] Int. Cl.⁵ .................................. G11B 7/095
[52] U.S. Cl. .................. 369/44.130; 369/44.280; 369/44.290
[58] Field of Search ............ 360/77.02, 78.04; 250/201.5; 369/44.27, 44.28, 44.29, 44.13

[56] References Cited

U.S. PATENT DOCUMENTS

| 4,546,460 | 10/1985 | Ando | 250/201.5 |
| 4,581,664 | 4/1986 | Sordello et al. | 360/78.04 |
| 4,700,056 | 10/1987 | Silvy et al. | 250/201.5 |
| 4,707,648 | 11/1987 | Minami . | |
| 4,769,801 | 9/1988 | Funada et al. | 250/201.5 X |
| 4,866,688 | 9/1989 | Ohtake et al. | 369/100 X |
| 4,893,201 | 1/1990 | Emori et al. | 360/78.04 X |

FOREIGN PATENT DOCUMENTS

| 62-107444 | 11/1987 | Japan | 369/44.27 |
| 62-277636 | 12/1987 | Japan | 369/44.27 |

Primary Examiner—Roy N. Envall, Jr.
Assistant Examiner—W. R. Young
Attorney, Agent, or Firm—Staas & Halsey

[57] ABSTRACT

An optical disk access system capable of varying the focus position of a beam spot illuminating the optical disk. The focus position of the beam spot is varied in accordance with a mode of operation of the optical disk system. The various focus positions are automatically selected by the optical disk access system by intentionally vibrating the beam spot in a radial direction of the optical disk and detecting the amount of light reflected from the optical disk while varying a signal that changes the focus position of the beam spot. The optical disk system automatically selects a value of the signal determining the focus position of the beam spot that corresponds to maximum values derived from the light reflected from the optical disk.

13 Claims, 17 Drawing Sheets

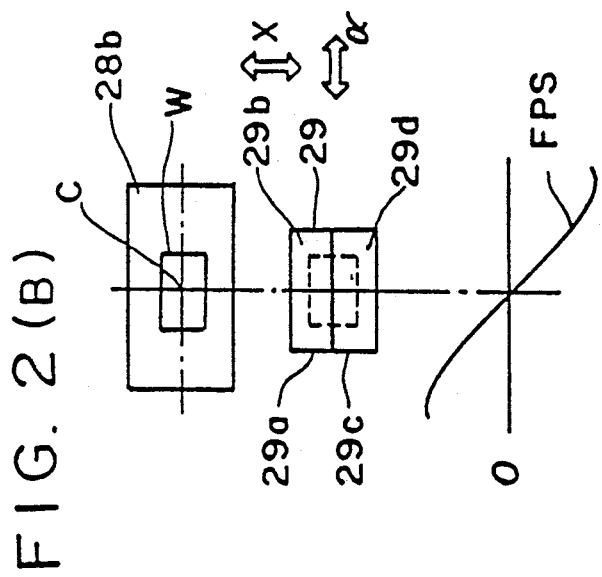
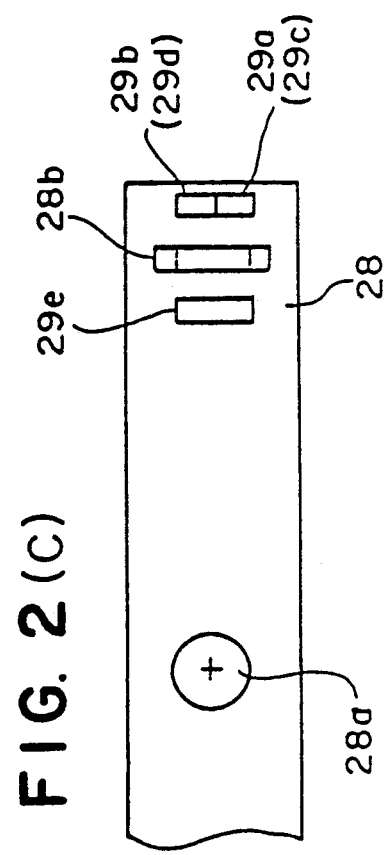

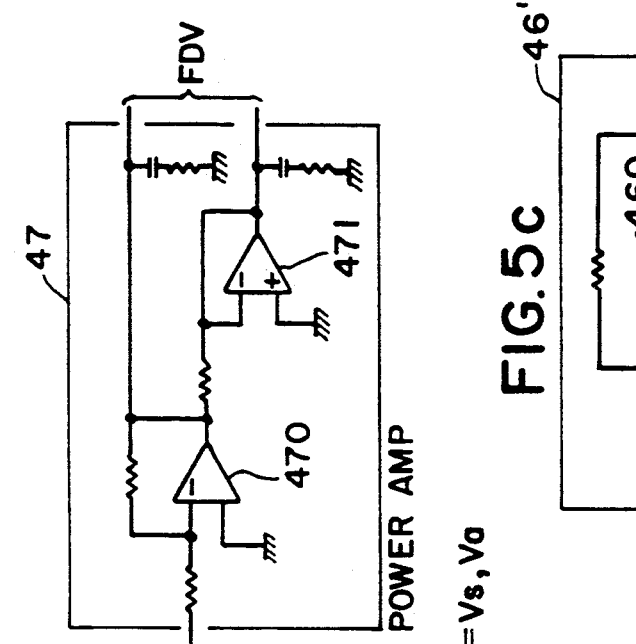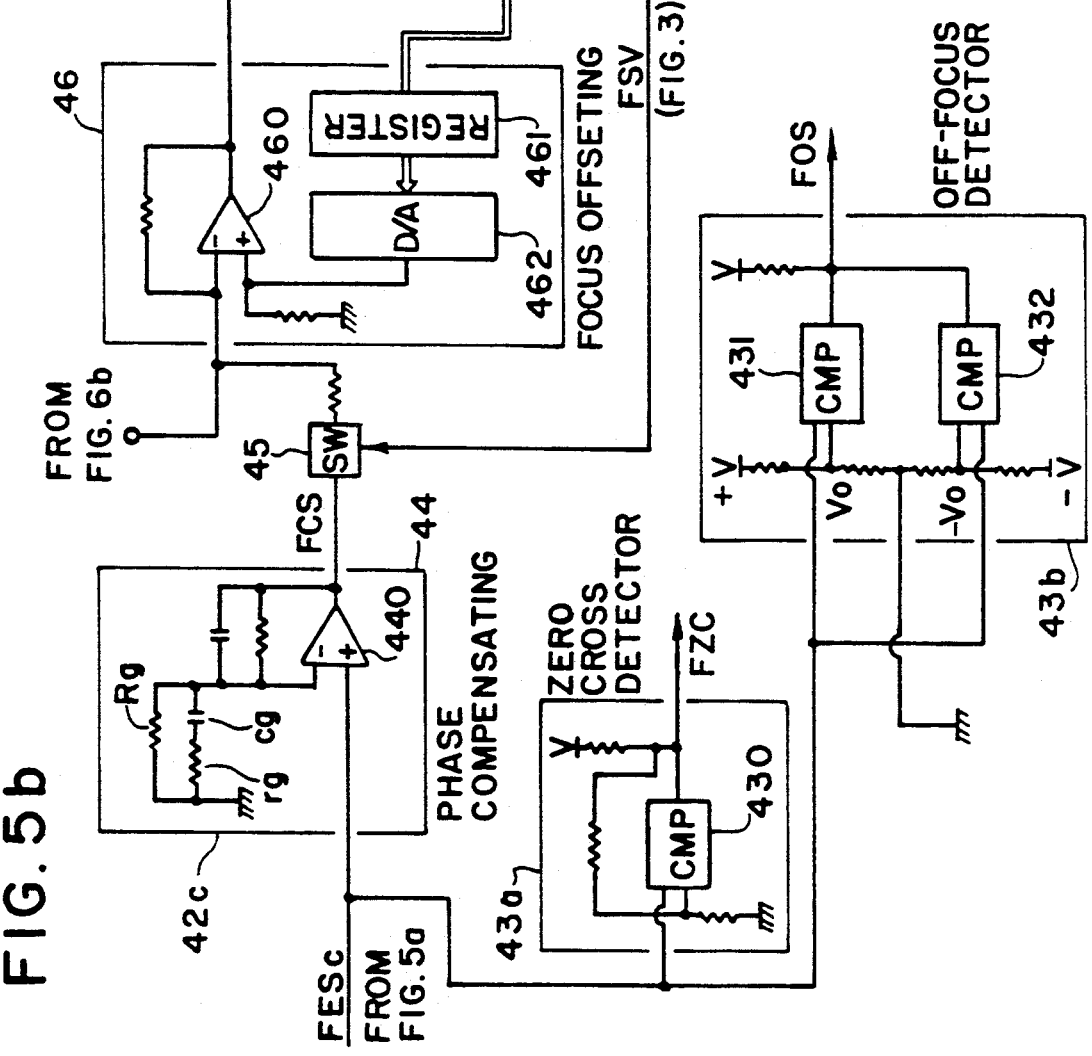
FIG.5c
FIG.5b

OPTICAL DISK ACCESS SYSTEM

BACKGROUND OF THE INVENTION

The present invention relates to an optical disk access system having a focus servo mechanism control system to control the focus and the tracking position of a light generated by an optical head and illuminating an optical disk. More particularly, the invention relates to a focus mechanism control system which automatically adjusts the focussing of an optical beam in accordance with an operational mode (e.g., read, write, seek) of an optical disk system. This automatic focussing provides an optical disk system that can operate accurately and fast.

Optical disks can be used as large capacity external memories. This is because the distance between adjacent recording tracks on an optical disk is narrow, for example, several micrometers, in a radial direction of the optical disk. A large number of tracks can therefore be located on a single disk. Because of the large amount of data stored on an optical disk, an optical disk access system must operate at high speed and accurately access the tracks. Fast and accurate operation is necessary in order to respond to access requests from a computer system.

Optical disk systems generally have a seek mode, a write mode and a read mode. In the write mode, data is written to an optical disk in an optical disk system. Writing is accomplished by, for example, generating a strong light beam via a laser diode and focussing this beam on the tracks of the optical disk. The written data ca be read in the read mode. To read, a lower intensity beam is focused on the tracks, and the amount of the beam reflected indicates the data stored in the tracks. In the seek mode, a low intensity beam is focused on the optical disk just as in the read mode.

In each mode, the laser beam must exactly follow the track of the optical disk and must be focussed onto the individual bit locations within the track. To accomplish this operation, an optical disk system includes a focus servo mechanism and a track servo mechanism. The focus servo mechanism forms the servo operation relating to focussing the laser beam onto the individual bits of data on a disk. This focussing operation is controlled in accordance With a focus error signal which is based on the actual amount of light reflected from the optical disk.

The track servo mechanism performs the servo operation needed for the laser beam to exactly follow a track. The track servo mechanism uses a track error signal which is also based upon the actual amount of light reflected from the optical disk. In such servo mechanism, it is necessary to offset the focus position of the laser beam with respect to the surface of a disk in order to perform an optimum servo operation. As described in U.S. Pat. No. 4,707,648, the amount of focus offset is chosen at the point where the track error signal has a maximum amplitude level. By selecting the focus offset in this manner, this optical servo mechanism can control the tracking of the laser beam using large amplitude track error signals. The dynamic range of this large amplitude track error signal is large and therefore the servo mechanism is more stable. However, reading and writing will be performed with the same focus offset as used in the seek mode. As a result, writing errors occur because the focus is not optimum for either reading or writing. Furthermore, the write error is derived from the phenomenon that the reflectivity of the disk is changed as a result of the writ(R)operation, thus altering the amount of reflected light that improperly causes the servo mechanism to adapt to the change in the amount of reflected light.

Moreover, the offset level is determined in dependence upon the amplitude of the track error signal which is measured while the optical disk is rotating. If the track error signal which is generated during one rotation of the optical disk has a high frequency, the track error signal is more precisely measured. This is because many sampling points can be obtained to determine the offset level. However, a high frequency track error signal can only be obtained if an optical disk has a large off-center variation; that is, the disk center hole is not precisely centered with respect to the tracks on the disk. Since optical disks normally do not have large off centered conditions, it is difficult to obtain precise measurement of track error.

SUMMARY OF THE INVENTION

An object of this invention is to provide a fast and accurate optical disk access system.

Another object of this invention is to provide an fast and accurate optical disk access system having a focus servo mechanism that operates in an optimum focus condition while accessing an optical disk.

Another object of this invention is to provide a fast and accurate optical disk access system with stable seek, read and write modes.

Another object of this invention is to provide a fast and accurate optical disk access system having a focus servo mechanism capable of maintaining a precise focus offset.

To achieve the above and other objects of the present invention, an embodiment of the present invention includes first optical means for illuminating the optical disk with a light beam spot having a focus position, and for changing the focus position of the beam spot in response to a focus control signal; optical head means for receiving light reflected from the optical disk and for providing receiving light signals varying in accordance with the intensity of the received reflected light focus error means for providing a focus error signal responsive to at least one of the receiving light signals; focus servo mechanism for generating the focus control signal in response to the focus error signal and at least on of a plurality of predetermined focus offset levels; and control means, operatively connected to said focus servo mechanism, for selecting the at least on of the predetermined focus offset levels in accordance with the seek mode and the another mode.

BRIEF DESCRIPTION OF THE DRAWINGS

FIGS. 2(A) through (C) illustrate an arrangement and response of an optical head in the optical disk access system of FIG. 1a;

FIGS. 5a through 5c are circuit diagrams for the focus servo control circuit of FIG. 3;

DETAILED DESCRIPTION OF THE PREFERRED EMBODIMENTS

An overview of a basic arrangement of the present invention will be described with reference to FIGS. 1a and 1b.

A. Basic Arrangement of a Servo Mechanism

Figure 1A:
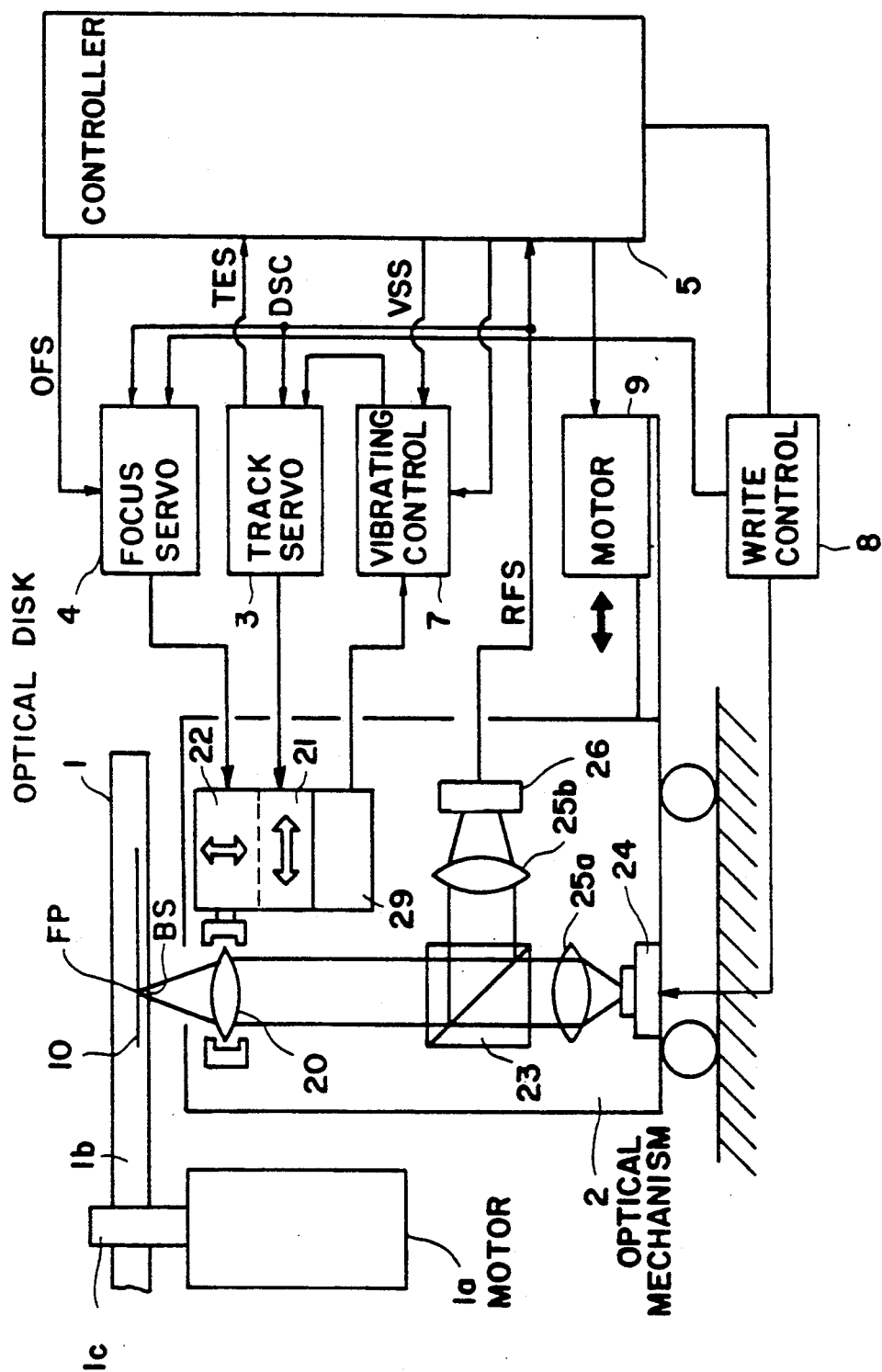
FIG. 1a is a block diagram of an optical disk access system including a focus servo mechanism control system according to the present invention.
Figure 1B:
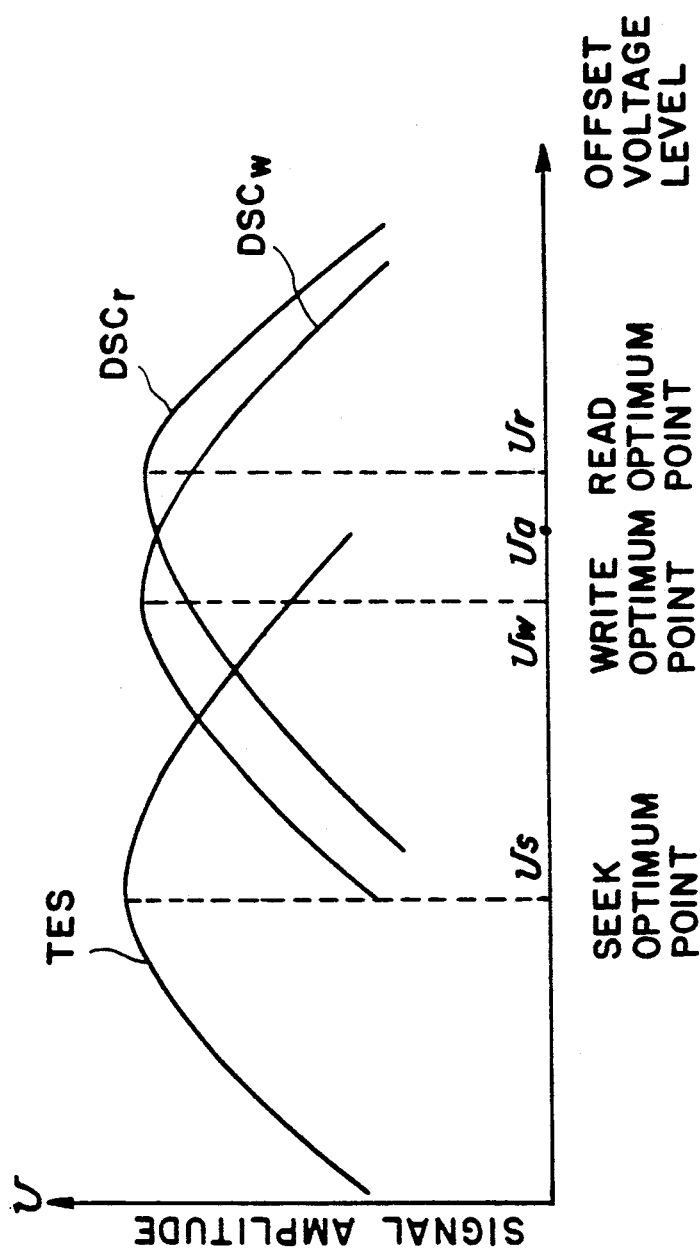
FIG. 1b is a graph for explaining an optimum focus offset level.

Referring to FIG. 1a, an optical disk access system includes an optical disk 1 having a recording surface 1b with a plurality of tracks defined thereon, and a rotating mechanism 1a, for example, a motor and a rotating shaft 1c. The rotating mechanism 1a rotates the shaft 1c to rotate the optical disk 1. The optical disk access system also includes an optical mechanism 2, a track servo mechanism 3, a focus servo mechanism unit 4, a control unit 5, a vibration control unit 7 and a writ control unit 8.

The optical head mechanism 2 includes an objective lens 20, a track actuator 21, a focus actuator 22, a beam splitter 23, a semiconductor laser which functions as a light source, lenses 25a and 25b, a light sensing device 26 and an actuator position sensor 29. In the optical head mechanism 2, the light beam generated by the semiconductor laser 24 is focused on the optical disk 1 by the combination of the lens 25a and the objective lens 20 through the beam splitter 23. The focus point FP of the focused beam depends on the position of the objective lens 20 with respect to the lens 25a. To automatically focus the beam spot BS and to have the beam automatically track (i.e., follow a track on the optical disk), a focus actuator 22 and a track actuator 21 are included in the optical head mechanism 2. The focus actuator 22 moves the focus point in a plane perpendicular to the surface of the optical disk 1 by moving the objective lens 20 towards and away from the disk 1. The track actuator 21 moves the focus point on the optical disk in a radial direction with respect to the optical disk 1. The motion of the actuators 21 and 22 is detected by a position sensor 29 and a light sensing device 26. The position sensor 29 provides an output signal corresponding to the position of the actuators 21 and 22. A reflection beam reflected from the optical disk 1 is guided to and focused on the light sensing device 26 by the objective lens 20, the beam splitter 23 and a lens 25b.

The light sensing device 26 provides an output signal varying in accordance with the amount of reflected light, which is based upon the track position in a radial direction of the disk and the vertical focus point position of the beam spot BS. This signal is fed back to the focus servo mechanism 4 and to the track servo mechanism 3. A position error signal representing a position error of the beam spot BS with respect to a track 10 may be produced in explained in U.S. Pat. No. 4,707,648 which is hereby incorporated by reference. In U.S. Pat. No. 4,707,648 a light sensing device comprises four individual sensors. In accordance with the above, the position error signal is obtained by combining these four outputs.

The track servo mechanism 3 controls the tracking of the beam spot BS in a desired track of a set of, for example, concentric tracks. The tracking is performed in accordance with the output signal from the light sensing device 26. The focus servo mechanism unit 4 combines the output signal, the sensing device 26 and an focus offset level signal, and outputs a control signal to the focus actuator 22 so that the focus point FP of the light beam can be positioned in accordance with the focus offset level.

The present invention employs at least two focus offset levels. One focus offset level is for the seek mode of the optical disk access system; and the other is for the write mode and the read mode of the optical access system. The controller 5 monitors the mode of the optical disk system and selects the proper focus offset level when the mode is switched. To do this, the controller 5 sends a signal OFS to the focus servo mechanism 4.

Namely, during a seek operation of the optical disk access system, the track servo mechanism does not operate properly due to excessive error signals generated a various tracks are traversed by the beam spot BS. Therefore, a position of the focus point, which makes the amplitude of the position error signal a maximum, should be used to stabilize the track servo mechanism during a seek operation. However, the track servo mechanism is stabled during a read/write operation after a seek operation, even though the focus point is not set to make the amplitude of the position error signal a maximum. In this situation, stable track servo control can still be performed. Therefore, there is no stability problem for the track servo control during a read/write operation, when the optical disk access system switches from the seek mode to the read/write mode with the focus point FP being optimum for the seek mode. Using this technique, the track servo mechanism can operate fast and stably during a seek mode since the mechanism can use a large amplitude position error signal to accomplish servo control. Moreover, since the optimum focus point can be used for both reading from and writing to the optical disk, the read/write operation can be accurately performed with the above technique for stabilizing the servo mechanism.

Furthermore, during the write mode the focus offset level is further modified by the focus servo mechanism unit 4 according to a signal from the write control unit 8 as shown in FIG. 1a. This modification stabilizes the write operation by preventing the focus error signal from including disturbances caused by the varying amounts of light reflected from the optical disk 1.

Several structures can be employed in order to make the focus servo mechanism unit 4 generate a plurality of focus offset levels at the proper time. For example, the focus servo mechanism can include two offset level generators. Each generator comprises a resistor and a switch for setting a desired offset level by selecting one of the resistors. The controller 5 switches between resistors so as to select a desired focus offset level.

In another example of the structure of a focus servo mechanism unit 4, the servo mechanism can include a register and a digital/analog converter (ADC). The ADC converts data stored in the register and supplies an analog signal as the focus offset level. To obtain a selected focus offset level, the controller 5 stores data representing the optimum focus offset level in the register. This store operation occurs when setting the mode of the optical disk access system. The optimum focus offset level is therefore provided at the proper time for performing a disk access, for example, a seek operation and/or a read/write operation.

B. A Preferable Optimum Focus Offset Level

The optimum focus points for each mode of operation are discussed below with respect to FIG. 1b. In the seek mode, the focus offset level $V_s$ shown in FIG. 1b should be selected. This focus offset level causes a maximum track error TES as shown. Therefore, the track servo mechanism 3 uses a maximum amplitude track error signal when performing track servo control.

The optimum focus offset level for the read mode is selected as $V_r$. At this point, the amplitude of a reflection level signal, DSC (e.g., FIGS. 1a and 3) is maximum. The reflection level signal DSC corresponds to the actual amount of the light beam reflected from the optical disk at the reading point. The reflection level signal during the read mode is shown as $DSC_R$ in FIG. 1b. At this point, the dynamic range of the read signal is maximum. The optimum focus offset level for the read mode is therefore selected at the level $V_r$.

The optimum focus offset level for the write mode is selected as $V_w$. The optimum write focus offset level is selected as follows. First, a write operation is performed under the condition that the offset level gradually changes (i.e., increases or decreases). Then, the reflection level signal (DSC) is monitored while the written data is read. The offset level $V_w$ is selected at the point where the signal DSC is a maximum. The monitored reflection level signal DSC during the write mode is shown as $DSC_W$ in FIG. 1b. The magnitude of the difference between the optimum offset points $V_w$ and $V_r$ depends upon the type of optical head mechanism 2. The difference, however, is normally small. Therefore, the optimum focus offset level $V_a$ which is an intermediate level between the points $V_w$ and $V_r$ is used as the focus offset level for read/write operations.

The relationship between the optimum focus offset level for a seek mode ($V_s$) and that for read/write modes ($V_w$ and $V_r$) depends upon the type of optical head 2. The optimum point $V_s$ can therefore be greater than or less than $V_r$. If various optical disk access systems have the same type of optical head, then each system will have essentially the same optimum focus offset levels ($V_s$, $V_w$ and $V_r$). Accordingly, the optimum seek focus offset level $V_s$ and the optimum read/write focus offset level $V_w$ and $V_r$ can be obtained by experiment. Optical disk access systems can then be adjusted at delivery time. This adjustment can comprise adjusting two offset generators in the focus servo mechanism unit 4.

In an example such as shown in FIG. 5c and explained later, the optimum focus offset level for the read/write mode is set to $V_a$, and the optimum focus offset level for the seek mode is set to $V_s$, where $V_a < V_s$. The switch 483 selects a first focus offset level generator so as to provide the read/write offset level $V_a$, or selects the voltage $V_b$ of a second focus offset level which is set to $V_s$.

C. A Preferable Method for Selecting an Optimum Focus Offset Level

The focus offset levels may be different for each access mode; for example, the seek mode, the read mode and the write mode. These optimum focus offset levels can be determined by any number of methods. One of these methods in accordance with the present invention includes vibrating the beam spot during the measurement of the amount of reflected light.

Vibration of the beam spot is performed under the control of the vibration unit 7, and the controller 5 shown in FIG. 1a. The controller 5 supplies a signal VVS to the vibration control unit 7. The unit 7 controls the vibration of the beam spot VS by supplying a vibration signal to the track servo mechanism unit 3. The vibration signal is added to the feedback signal from the light sensing device 26. Since the output signal of the track servo mechanism unit 3 includes a vibration signal, the track actuator vibrates the beam spot BS.

With such vibration of the beam spot BS, the controller 5 gradually changes the focus offset level and simultaneously measures the amplitude the track error signal TES and the reflection level signal DSC which corresponds to the read signal of the optical disk. After completing these measurements, the controller 5 selects the optimum focus offset level for the seek mode based on the measured track error signal TES, and selects the optimum focus offset level for the read/write mode based on the respective maximums of the signals $DSC_R$ and $DSC_W$.

Figure 7:
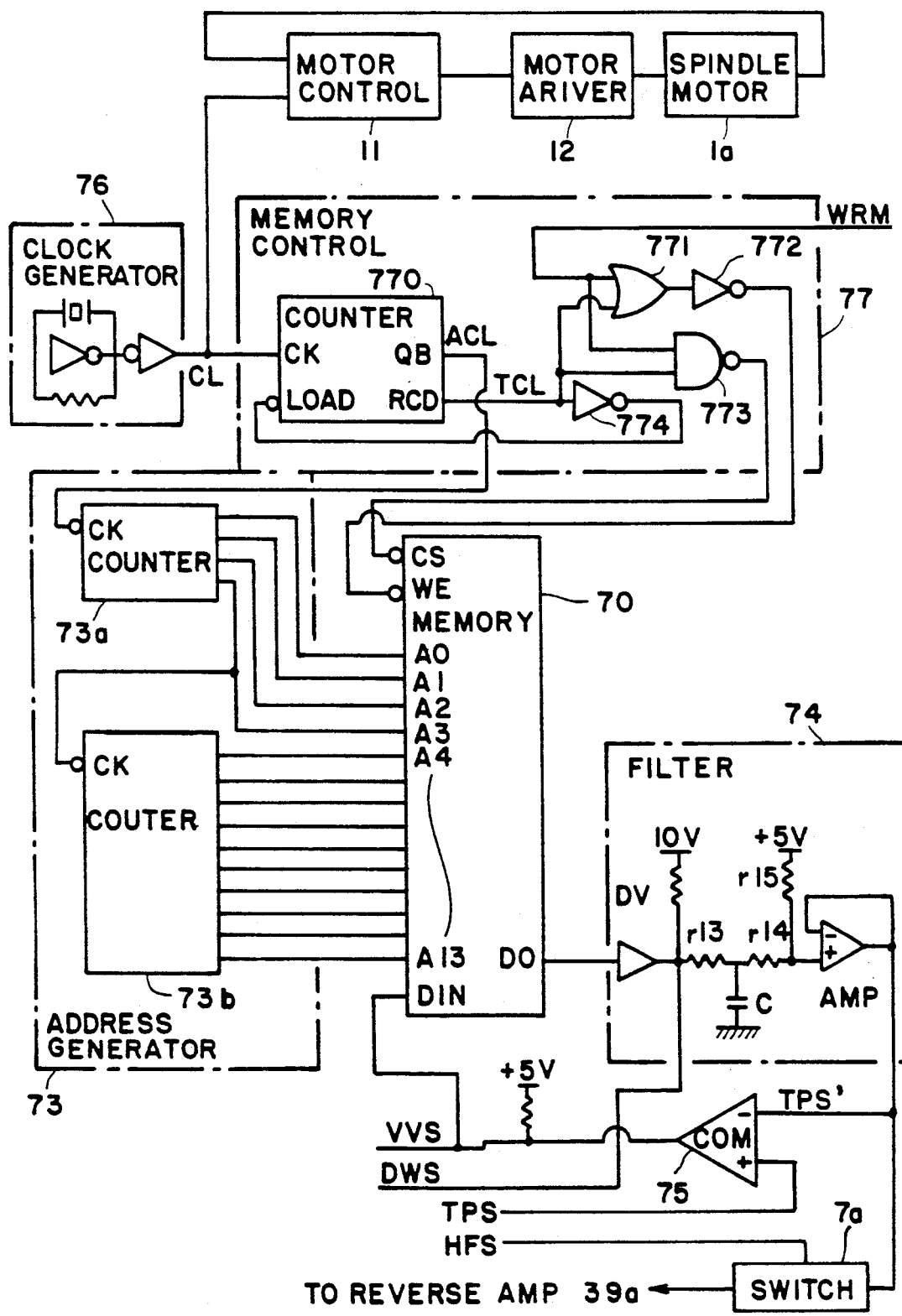
FIG. 7 is a circuit diagram of the vibration control unit of FIG. 3.

A vibration control unit 7 can also include a wave memory for storing an output of the position sensor 26 as optical disk off-center information, and for providing the track servo mechanism unit 3 with the vibration signal so as to move the beam spot BS in accordance with the off-center information before track servo control actually begins. The wave memory is shown in FIG. 7 as memory 70 and is discussed in detail below. In such a circuit, controller 5 stores the vibration information in the wave memory before operation starts. Then, the unit 7 supplies vibration information to the track servo mechanism 3. The track servo mechanism 3 causes the beam spot BS to vibrate in a radial direction of the optical disk via the actuator 21, in accordance with the vibration information. While the beam spot BS is vibrating, the controller 5 gradually changes the focus offset level applied to the focus servo mechanism unit 4, and measures the track error signal TES and the reflection level signal DSC.

After completing these measurements, the controller 5 selects the optimum focus offset for the seek mode and the read/write mode based on the respective maximums of the signals TES and DSC.

With the above technique of vibrating the beam spot BS, the track error signal has a high frequency regardless of whether or not the optical disk has an off-center condition. As a result, the optimum focus offset levels can be precisely selected. In addition, because the optimum seek focus offset level is selected at a point where the maximum track error (TES) occurs, the large track error makes track servo control stable and precise. Similarly, selection of optimum focus offset levels for the read mode and the write mode at points where the reflection signal DSC (i.e., $DSC_R$ and $DSC_W$) are maximum, ensures that the read and write operations are precise and accurate.

D. Detailed Description of the Circuits Embodying the Present Invention

1. The Optical Mechanism

Referring to FIG. 2, an optical head mechanism forming a beam spot on an optical disk 1 includes: the laser source 24, the lens 25a, a prism 25c, a beam splitter 23, a ¼ wavelength plate 20a, and the objective lens 20. The laser beam generated by the laser source 24 is formed into a parallel beam by the lens 25a. The parallel beam is formed into a circular beam by the prism 25c. The light beam that passes through the prism 25c also passes through the beam splitter and the ¼ wavelength plate 20a and is then focused by the objective lens 20. On the other hand, the light reflected from the disk is guided into the light sensing device 26 through the objective lens 20, the ¼ wavelength 20a, the beam splitter 23 and the lens 25b. The laser source 25, lens 25a and 25, the prism 25c, the beam splitter 23 and the light sensing device 26 are fixed on a optical head mechanism frame (not shown). The frame is constructed so as to be able to move in the radial direction of the optical disk.

The objective lens 20 is fixed to one edge of a movable plate 28. The movable plate 28 can rotate about a rotation axis 28a. A fixed protrusion 28b is provided on another edge of the movable plate 28. The actuator includes a coil portion 28c. A focus coil 22 surrounds the coil portion 28c. A track coil 21 is formed in a spiral within the coil portion 28c. A magnet 28d surrounds the coil portion 28c.

Figure 2A:
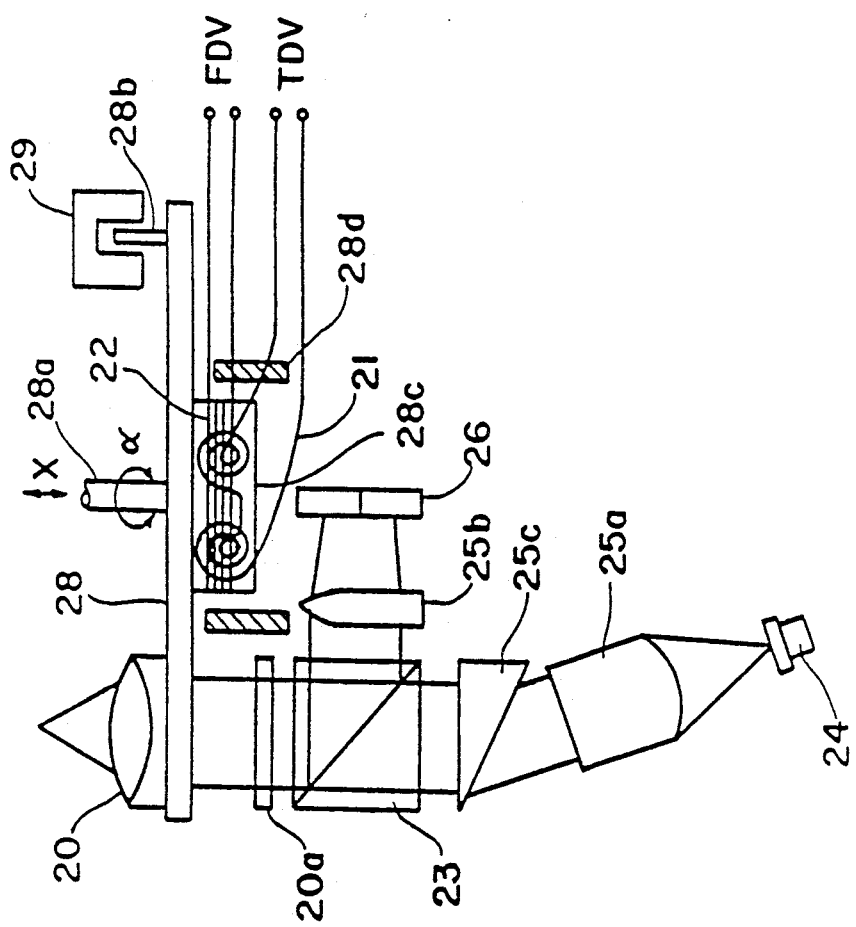

When electric current flows through the focus coil 22, the movable plate 28 moves up or down along an X axis as shown in FIG. 2(a). The coil 22 and plate 28 function in the same manner as a voice coil motor. Moving the movable plates 28 in this manner causes the focus point to move in accordance with the current supplied via a terminal FDV. Together, the movable plate 28 and the coil 22 comprise a focus actuator. When electric current flows through the track coil 21, the movable plate 28 rotates about the axis 28a in the α direction as shown in FIG. 2(a).

The fixed protrusion 28b is positioned opposite the position sensor 29 which is fixed to the frame. The position sensor 29 includes a light source 29e and light sensors 29a through 29d. The light sensors are arranged as shown in FIG. 2(b). In a normal position of the movable plate 28, the light source 29e opposes the light sensors 29a through 29d, through a window W in the fixed protrusion 28b. Accordingly, the light generated by the light source 29e is received by the light sensors 29a through 29d. The distribution of the light at the light sensors 29a through 29d changes based upon the motion of the movable plate 28 in the X and α directions. If the light received by the light sensors 29a through 29d is respectively denoted as LA, LB, LC and LD, then a position signal TPS indicating the track position and a position signal FPS indicating the focus position ar obtained by the following formulas:

$$TPS = (La + Lb) - (Lb + Ld) \quad (1)$$

$$FPS = (La = Lb) - (Lc + Ld) \quad (2)$$

As shown in FIG. 2B, the position signals TPS and FPS have an "S" shape about a center point C. At the point C, the position signals are both zero. The position signal can therefore be used to move the movable plate 28 towards a position where the position signals are zero (i.e., the position C).

2. Circuit Arrangements a. Controller 5

The controller 5 can comprise a microprocessor and operate according to a program, flow charts for which are discussed below. The controller 5 controls focussing by controlling the focus servo mechanism unit 4 and controls tracking of the optical head by controlling the track servo mechanism 3 and a motor (not shown). A controller 5 also performs the measuring and the selecting operations for determining the optimum focus offset levels. The operation of the controller is explained in detail below.

b. Head Portion Circuit 6 in FIGS. 3 and 4.

A head portion circuit 6 (FIGS. 3 and 4) includes a RF generating circuit 50, an amplifier 51, a PS generating circuit 52 and a constant voltage source 53. The RF generating circuit 50 generates a RF signal RFS based upon four output signals (a, b, c and d) from the light sensing device 26. The amplifier 51 amplifies the output signals a through d and provides several outputs $SV_a$ through $SV_d$. The pulse generating circuit 52 generates a focus position signal FPS based upon light received by the light sensors 29a through 29d of the position sensor 29. The constant voltage source 53 supplies power to each circuit of the head portion circuit 6.

Figure 4:
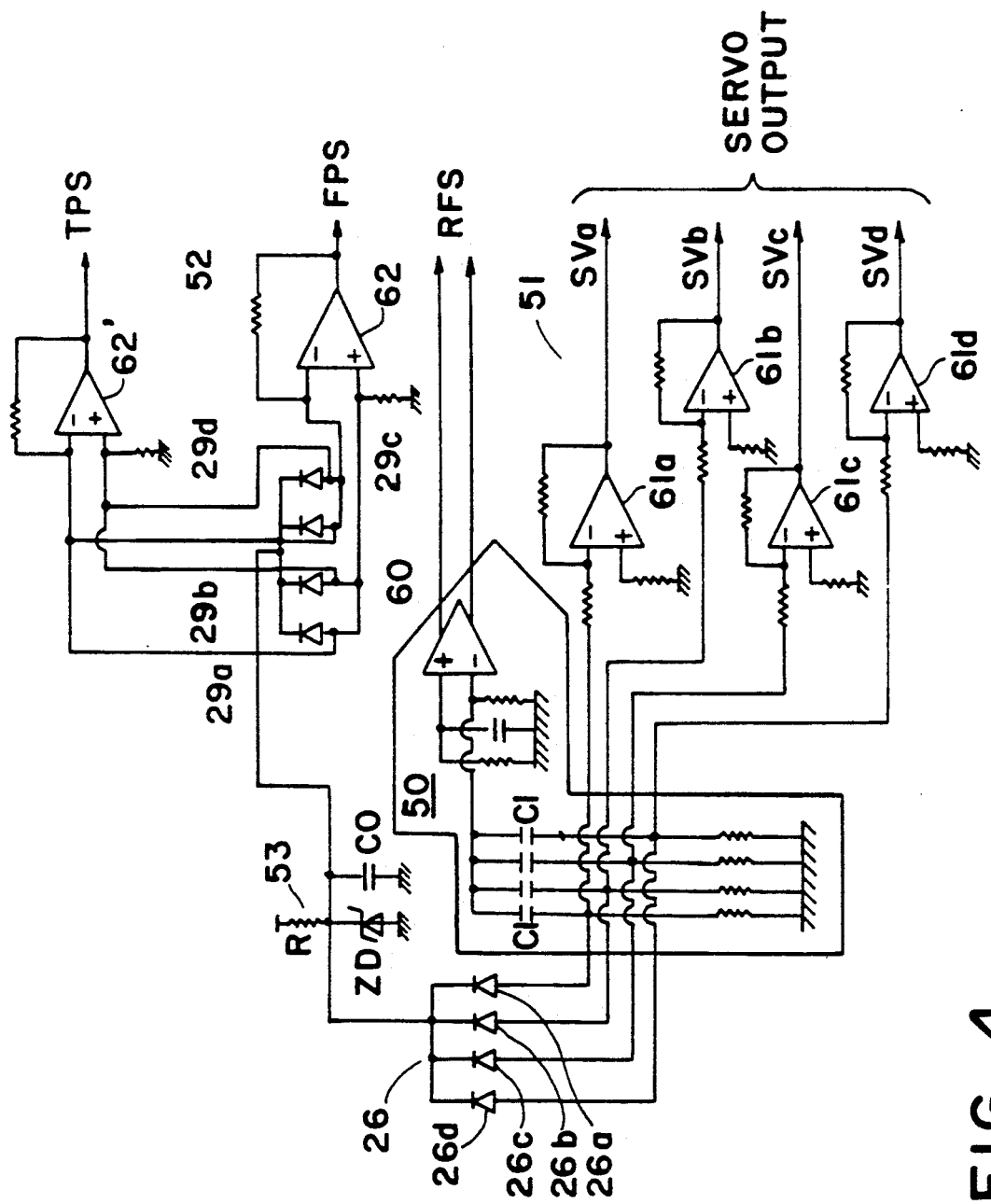
FIG. 4 is a circuit diagram of a part of an optical disk head drive circuit for the FIGS. 2 and 3 systems.

The constant voltage source 53 can have any number of structures. One such structure is illustrated in FIG. 4. Referring to FIG. 4, the constant voltage source 53 comprises a zener diode ZD, a capacitor C and a resistor R. The light sensing device 26 comprises four photo diodes 26a through 26d; and the position sensor means 29 comprises four photodiodes 29a through 29d. The constant voltage source 53 is connected to the light sensing device 26 and position sensor 29 as shown in FIG. 4. The PS signal generator 52 includes amplifiers 62 and 62' such as an operational amplifier as shown in FIG. 4. The amplifier 62 shown in FIG. 4 generates the focus position signal (FPS) according to the following formula:

$$(La + Lc) - (Lb + Ld) \quad (3)$$

The amplifier 62' generates the track position signal TPS according to the following formula:

$$(La + Lb) - (Lc + Ld) \quad (4)$$

The RF signal generating circuit 50 includes an amplifier 60 which is connected to operate as a high pass filter. The alternating RF currents provided as output signals of the photodiode 26a through 26d are added through capacitors C1. The added signal is then amplified by the amplifier 60. Then the output of amplifier 60 is applied to the controller 50 as the RFS signal.

The amplifier 51 comprises four amplifiers 61a through 61d which are respectively connected to corresponding ones of photodiodes 26a through 26d. Each amplifier provides a respective servo output signal SVa, SVb, SVc or SVd.

c. The Focus Servo Mechanism

Figure 3:
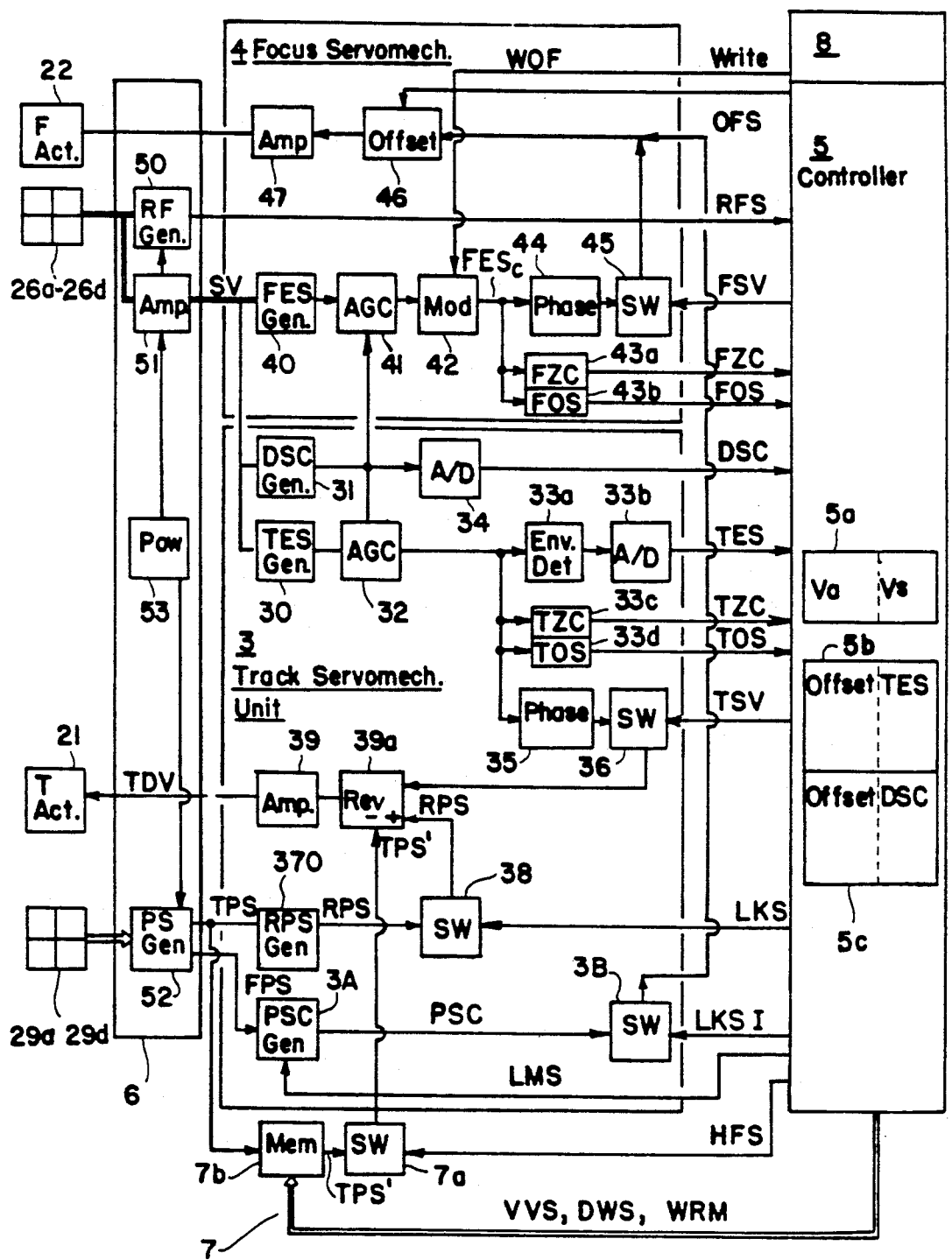
FIG. 3 is a block diagram of the optical disk access system of FIG. 1.
Figure 5A:
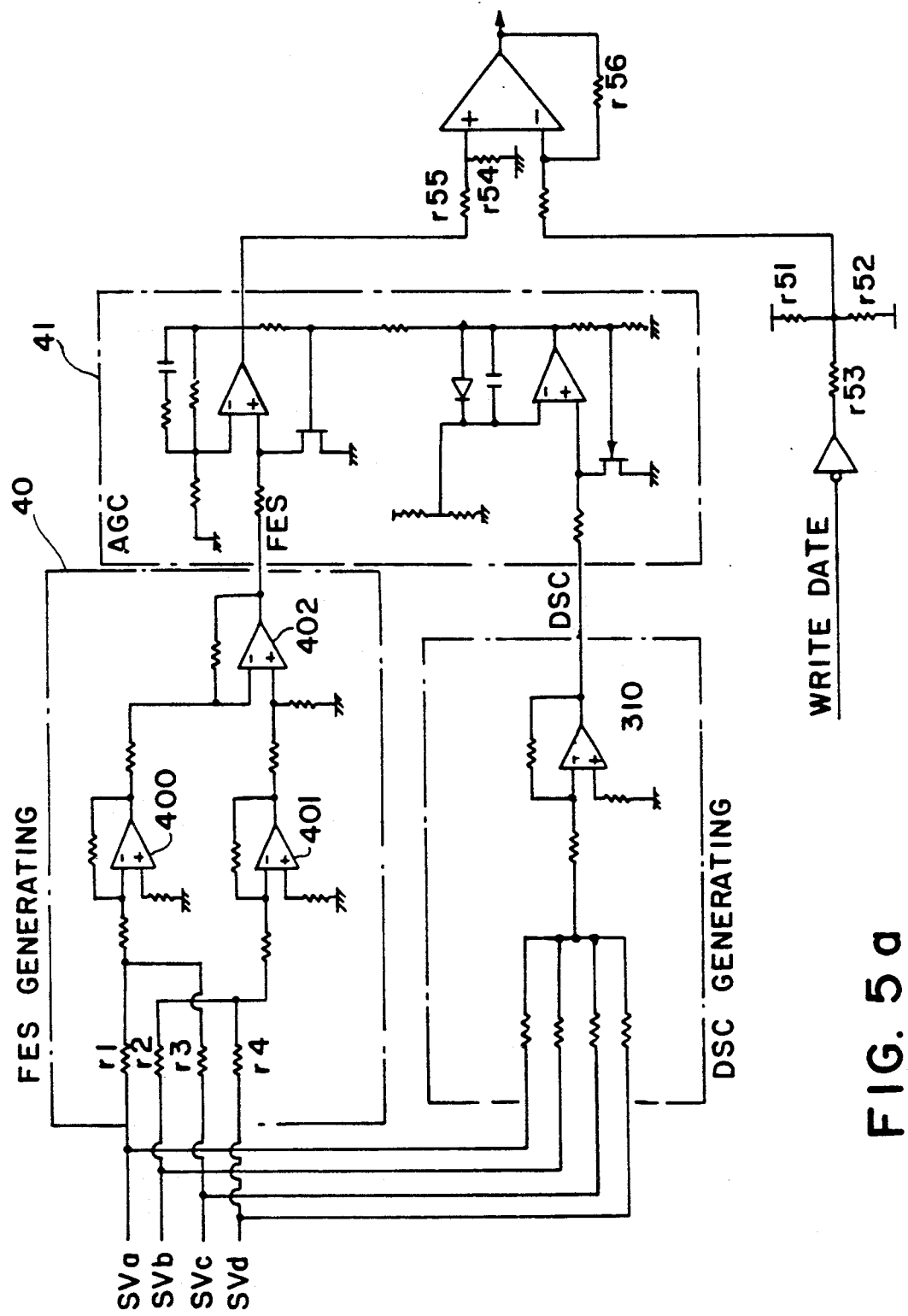

The details of the focus servo mechanism 4 are shown in FIGS. 5a and 5b. Each block in FIG. 3 is explained in detail with reference to FIGS. 5a and 5b. Reference numeral 40 in FIG. 5a identifies a FES (focus error signal) generating circuit. The FES generating circuit 40 generates a focus error signal FES based on servo output signal SVa, SVb, SVc, and SVd. The FES generating circuit 40 provides the output signal FES in accordance with the formula:

$$(SVa+SVc)-(SVb+SVd) \quad (5)$$

The FES generating circuit 40 includes operational amplifiers 400, 401 and 402. These amplifiers together with their associated resistors comprise additional/subtraction circuits. Namely, the amplifier 400, its associated resistors and the resistors R1, R2 comprise an addition circuit which outputs a signal in accordance with the formula:

$$G1\times(SVa+SVc) \quad (6)$$

where G1 denotes a gain of the unit including the amplifier 400. In a similar way, a unit including the amplifier 401, its associated resistors and the resistors R2 and R4 outputs a signal in accordance with the formula $$G2\times(SVb+SVd) \quad (7)$$

where G2 denotes a gain of the unit including amplifier 401. The amplifier 402 and its associated resistors comprise a substraction circuit which subtracts the output signals of the amplifiers 400 and 401. The amplifier 402 therefore provides the focus error signal FES in accordance with the formula:

$$G1\times(SVa+SVc)-G2\times(SVb+SVd) \quad (8)$$

The DSC generating circuit 31 includes an operational amplifier 310, parallel connected resistors R5, R6, R7 and R8, and the resistors associated with amplifier 310. The DSC generating circuit 31 adds the servo output signals SVa, SVb, SVc, and SVd in accordance with the formula:

$$SVa+SVb+SVc+SVd \quad (9)$$

in order to provide the summing signal DSC.

Reference numeral 41 identifies an automatic gain control circuit, AGC. The AGC circuit 41 reduces the signal variations that occur because of beam intensity and reflectivity variations The AGC 41 divides the focus error signal FES by the summing signal DSC. Since the summing signal DSC indicates the total amount of reflected light received at the light sensing device 26, the AGC performs automatic gain control based on this indication of the total amount of received reflected light. Referring to FIG. 5a, the AGC 41 comprises operational amplifiers 410 and 412, and field effect transistors 411 and 413.

The amplifier 410 receives the focus error signal generated by the FES generating circuit 40. The FET 411 controls the magnitude of the FES signal applied to amplifier 410. The FET 411 controls the input voltage applied to amplifier 410 by changing the resistance seen by FES generating circuit 40 in accordance with the output signal level of the operational amplifier 410. Such control essentially controls the gain of amplifier 410. In a similar way, amplifier 412 and FET 413 operate on the summing signal DSC provided by the DSC generating circuit 31. The outputs of the operational amplifiers 410 and 412 are combined so that the focus error signal varies in accordance with the total amount of reflected light.

Reference numeral 42 is a write offset correcting circuit. As shown in FIG. 5a, the write offset correcting circuit 42 includes subtracting circuit 42a and a write offset generating circuit 2b. The write generating circuit 42b includes an inversion buffer BF which inverts the write data, and voltage adjusting resistors R51, R52, R53 and R54. The write generating circuit 42b operates to filter the high frequency write data and to provide a write offset signal WOF in response to write data. The write offset correcting circuit 42 corrects the focus error signal FES in accordance with the write offset signal WOF so that the focus offset level during an actual write mode can be stabilized regardless of variations in the focus error signal FES. Namely, during a write operation, the circuit 42a subtracts the write offset signal WOF, which is applied through a resistor R54 from the focus error signal FES which is then applied through a resistor R55. The resistor R56 enables adjustment of the gain of the operational amplifier 42a.

The output terminal of the write offset correcting circuit 42 (output of amplifier 42a) in FIG. 5a is connected to the terminal 42c shown in FIG. 5b. Referring to FIG. 5b, a phase compensating circuit 44 differentiates the compensated focus error signal $FES_c$ and adds a proportional element of the compensated focus error signal $FES_c$ to cause the phase in the higher frequency region of the FES signal to lead the phase of $FES_c$. The phase compensation circuit 44 includes a differential circuit comprising a resistor Rg and a capacitor Cg, a resistor rg and an operational amplifier 440. The phase compensating circuit 44 differentiates the focus error signal FES via a circuit path including the resistor rg and the capacitor Cg. The proportional element of the compensated focus error signal $FES_c$ is added via resistor $R_g$. The phase compensating circuit 44 outputs a signal FCS having a phase that leads the phase of the compensated focus error signal $FES_c$.

Reference numeral 45 is a switch that is controlled by the signal FSV supplied by the controller 5 shown in FIG. 3. When the signal FSV is in the ON state, the output signal of the phase compensating circuit 44, FCS, is applied to the focus offsetting circuit 46.

The focus offsetting circuit 46 comprises an adding amplifier 460, a register 461 and a digital to analog converter 462. The register 461 stores the focus offset level sent from the controller 5 shown in FIG. 3. When the controller 5 supplies the focus offset level (e.g. $V_a$, $V_s$ from registers in controller 5), the register 461 stores the offset level and the D/A converter converts the focus offset level from a digital form to an analog form. The analog focus offset level is supplied to the adding operational amplifier 460 so as to introduce the focus offset level into the focus servo loop. The controller 5 must send the focus offset level to register 461 each time the mode of the optical disk access system changes.

The circuit shown in FIG. 5c can be used as an alternative to the circuit 46 shown in FIG. 5b. The FIG. 5c circuit includes resistor combinations 481 and 482 for providing different voltage levels (i.e., different focus offset levels). A switch 483 connects the resistor combination 482 to the input side of an additional operational amplifier 460. The switch 483 connects or disconnects resistor combination 482 to the amplifier in accordance with the offset changeover signal OFS. In particular, when the offset changeover signal OFS is off (e.g. logic low), the switch 483 disconnects the combination 482. Thus, only a voltage Va is combined with the output of the switch 45 and an output of a switch 38 (shown in FIG. 6b and explained later) by the operational amplifier 460.

Figure 6A:
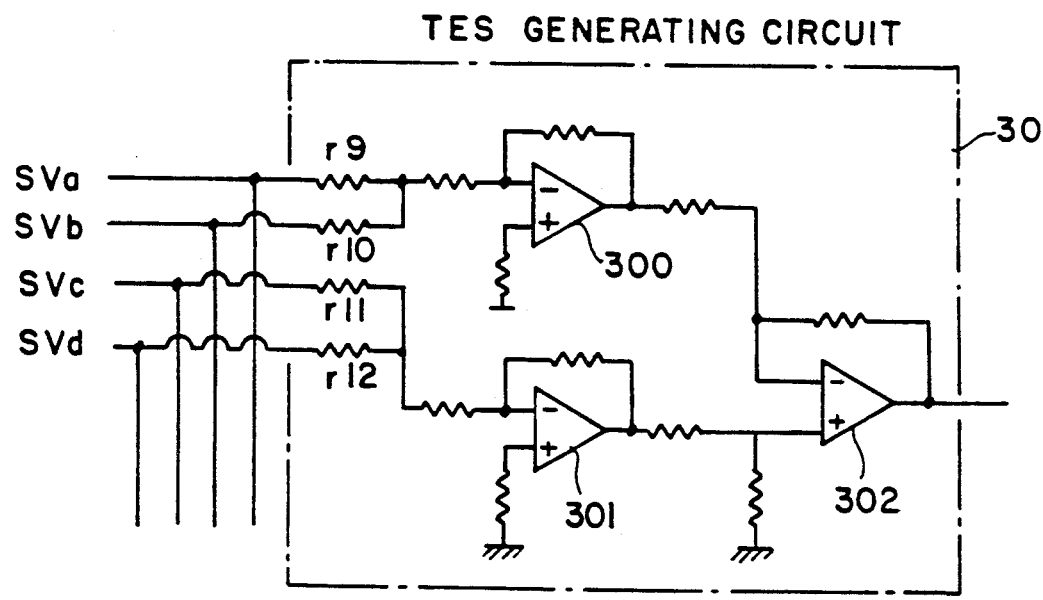
FIGS. 6a and 6b are circuit diagrams of part of the track servo control circuit of FIG. 3.
Figure 6B:
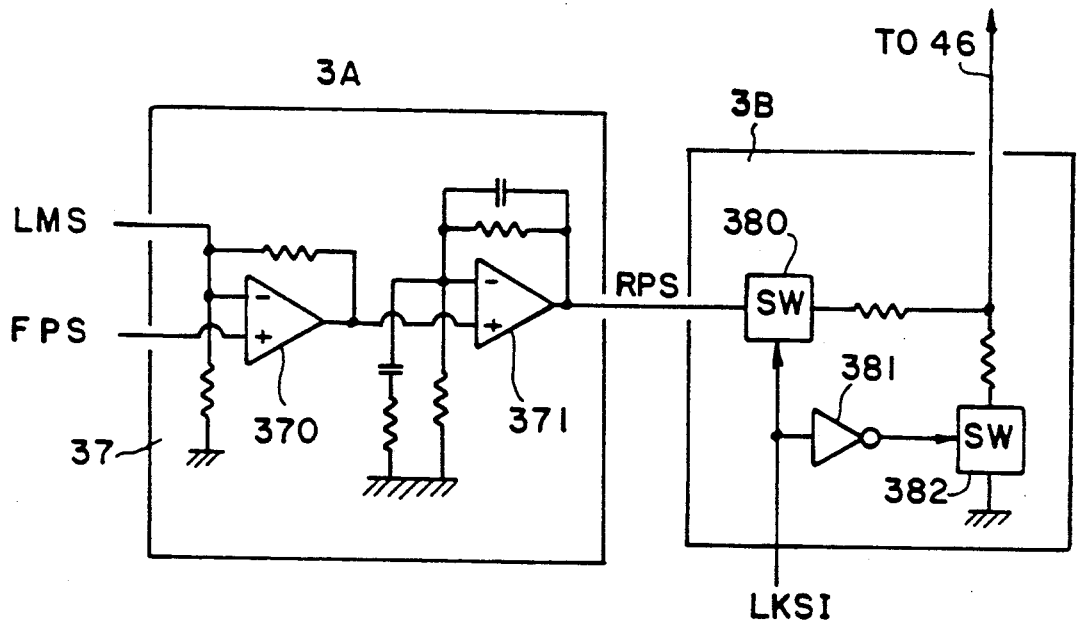

When the offset changeover signal OFS is on (e.g., logic high) the switch 43 connects the combination 482 to the input of the additional amplifier 460. The input voltage level of the operational amplifier 460 is therefore a voltage corresponding to $Vs=(Va+Vb)/2$, where the term Vb corresponds to a voltage level provided by the circuit 42. The other input terminal of the operational amplifier 460 is connected to the switches 45 and 38 (FIG. 6b). The Operational amplifier 460 combines the voltage $V_s$ with the sum of the outputs of switches 38 and 45. The circuit 46' requires the controller 5 to provide the signal OFS in order to control switch 483. With this circuit, the focus offset level can be manually changed.

A power amplifier 47 comprises two cascaded amplifiers 470 and 471. These amplifiers amplify the output signal of the focus offsetting circuit 46 and provide a driving current FDV to the focus actuator 22. The FDV signal moves the actuator in accordance with the focus error signal FES and the focus offset level.

In FIG. 5c, reference numeral 43a identifies a zero crossing detector. The zero crossing detector 43a comprises a comparator 430. The comparator 430 compares the compensated focus error signal $FES_c$ (provided by the write offset correcting circuit 42) with the zero crossing potential set by a peripheral resistor and the potential V in the zero crossing detector 43a. The comparator 430 provides a zero crossing signal FZC to the controller 5.

An off-focus detector 43b (FIGS. 3 and 5c) includes comparators 431 and 432. The comparator 431 compares the compensated focus error signal $FES_c$ with a constant voltage V0. When the compensated focus error signal level is larger than the constant voltage ($FES_c > V0$) the status of the output signal provided by the comparator 431 is a logic high. When $FES_c < V0$, the output of comparator 431 is a logic low. The comparator 432 compares the compensated focus error signal $FES_c$ with a constant voltage $-V0$. When the focus offset signal is less than $-V0$ ($FES_c < -V0$), the output of comparator 432 is a logic high. When $FES_c > -V0$, the output of comparator 432 is a logic low. The off-focus signal FOS provided by the off-focus detector 43b corresponds to the sum of the output of the comparator 431 and the output of the comparator 432.

d. The Track Servo Mechanism Unit

Referring to FIG. 3, the track servo mechanism unit 3 includes a TES generator 30 which generates a track error signal TES' based on the servo outputs SVa through SVd. The servo outputs correspond to the amount of light received by the sensing devices 26a through 26d. FIG. 6a illustrates the details of the TES generator 30. The TES generator 30 includes resistors r9, r10, r11 and r12, and operational amplifiers 300, 301 and 302. Operational amplifier 300 and resistors r1 and r2 are connected so as to form a circuit to add the input signals SVa and SVb. In a similar way, the operational amplifier 301 and resistors r3 and r4 are connected so as to form a circuit to add the input signals SVc and SVd. The operational amplifier 302 subtracts the output of amplifier 300 from the output of amplifier 301 so as to provide the track error signal TES.

As mentioned above, the DCS generator 31 (FIG. 5a) generates the summing signal DCS based on the servo output signals SVa through SVd. The summing signal DCS indicates the total reflected light received by the light sensing device 26. The summing signal DSC is converted by the A/D converter 34 (FIG. 3) and is applied to the controller 5 as a receiving signal that includes information identifying data stored on the optical disk.

In FIG. 3, automatic gain control circuit 32 can have a structure similar to that of AGC 41. The AGC 32 divides the track error signal TES by the summing signal DSC, and controls the gain of the circuit 32 in order to compensate for change in the intensity of the light beam or the reflectivity of the optical disk.

In FIG. 3, an envelope detector 33a detects the envelope of the track error signal TES received from the AGC 32. The amplitude of the envelope of the TES signal is converted from analog to digital by an A/D converter 33b. The A/D converter 33b supplies the controller 5 with this converted digital signal as a track error signal TES used by the controller 5.

In FIG. 3, a phase compensation circuit 35 has a structure similar to that of the phase compensating circuit 34. The phase compensating signal provided by the phase compensation circuit 35 is applied to a reversal amplifier 39a through a switch 36. The switch 36 is controlled by a track-servo-on signal TSV provided by the controller 5. When the track-servo-on signal TSV is on (e.g., logic high), switch 36 closes the servo loop of the track servo mechanism. When the track-servo-on signal is off (e.g., logic low), the switch 36 opens the track servo mechanism servo loop.

A RPS generator 37 shown in FIG. 3, generates a returning power signal RPS based on the track position signal TPS so as to provide the track actuator 21 with the power to move in a radial direction of the optical disk. Namely, referring to FIG. 6b, the RPS generator includes operational amplifiers 370 and 371.

A lock-on switch 38 is operated by a lock-on signal LKS provided by the controller 5. Namely, the switch 380 connects the RPS generator 37 to the servo loop so as to provide the returning power signal RPS for the servo control for tracking, when the lock-on signal LKS is high. When the lock-on signal LKS is low, switch 380 opens, disconnecting the RPS generator 37 from the track servo loop, connecting the earth level to the output level of the switch 38.

Referring to FIG. 3, the signal from switch 36 (which is derived from the output of the light sensing device 26), and the signal from switch 38 are added in a reverse circuit 38a. The polarity of the resulting signal is reversed, and this signal is added to the vibration control signal provided by the vibration control unit 7. Namely, the track driving signal TDV is derived by subtracting the output of switch 7a from the combination of the outputs of switches 36 and 38. A power amplifier 39 amplifies the output signal of the reverse circuit 38a and provides the track actuator 21 with the amplified track drive signal TDV.

Furthermore, the track servo mechanism unit 3 includes a PSC generator 3A and a switch 3B for an initial adjustment of the focus mechanism as shown in FIG. 6b. The PSC generator 3A includes operational amplifiers 370 and 371. Operational amplifier 370 amplifies a difference between the focus position signal FPS provided by the PS generating circuit 52 (FIG. 4) and a signal LMS provided by the controller 5 (FIG. 5). During initialization, as explained later, the controller 5 gradually changes the signal level of the signal LMS in order to adjust the focus position of the beam. Operational amplifier 371 together with its associated resistors and capacitors comprises a phase compensating circuit. The output of the operational amplifier 371 is a position control signal PCS that is used for moving the focus position during initialization, i.e., during power up of the system.

The switch 3B includes switches 380 and 382, and an inverter 381. Switches 380 and 382 operate respectively to close and open when LKSI is a high level. Namely, switch 380 connects the PSC generator 3A to the servo loop so as to provide the position control signal PSC for the servo control of focusing, when the signal LKSI is high. Namely, the controller 5 changes the signal level of the signal LMS during the initial focus adjustment. At the same time, the switch 382 opens, disconnecting the earth level from the output of switch 3B. When the signal LKSI is low, the switch 380 opens, disconnecting the PSC generator 3A from the focus servo loop and the switch 382 closes, connecting the earth level to the output of the switch 3B.

e. The Vibration Control Unit

Figure 8:
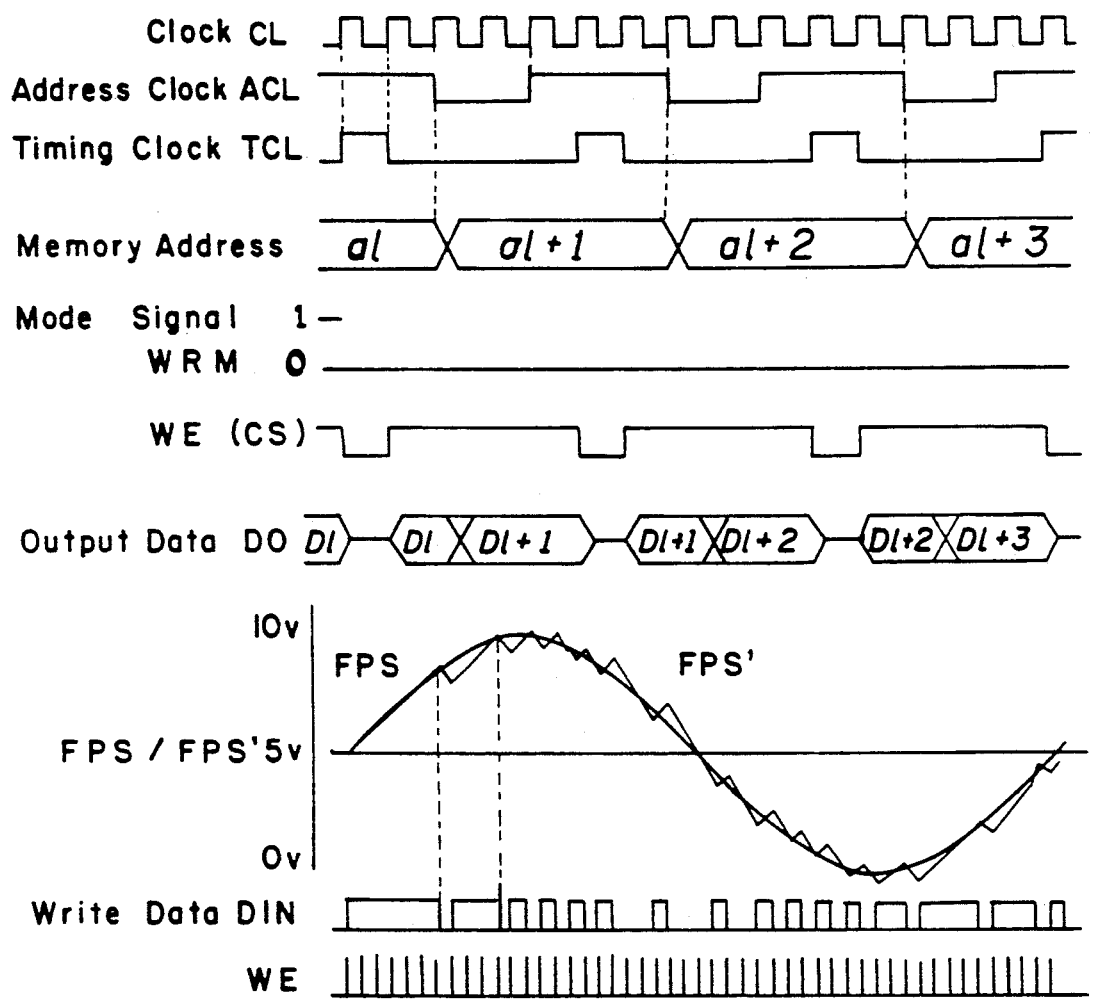
FIG. 8 is a timing chart illustrating the relationship among various signals of the circuits shown in FIG. 4.

FIG. 7 illustrates the structure of the vibration control unit shown in FIG. 3. FIG. 8 is a timing chart illustrating the relationships among the various signals in the FIG. 7 circuit.

i. Structure

Reference numeral 70 identifies a memory comprising, for example, a 16 k bit Random Access Memory. Data supplied to an input terminal DIN of memory 70 is stored when a write enable signal WE is applied to a terminal WE of memory 70. Data is read out of memory 70 via a terminal DO of the memory 70.

Reference numeral 73 identifies an address generator that provides address signals/bits to memory 70. The address generator 73 can generate any number of address signals/bits, for example, 14 address signals, A0 to A13 as shown in FIG. 7. The address generator 73 includes a lower digit address counter 73a and an upper digit address counter 73b. The lower digit address counter 73a generates the address signals/bits A0, A1, A2, and A3 which correspond to the lower four bits of the memory address. A clock signal applied to the lower digit address counter 73a is an address clock ACL from a memory controller 77. The upper digit address counter 73b generates the upper address signals/bits A4 through A13. The output of the upper most digit of the lower digit address counter 73 is used as the clock for the upper digit address counter 73b.

Reference numeral 74 identifies a filter. The filter 74 integrates (low pass filters) the data bit, DO, of the memory 70 to provide a reproduced signal FPS'. The filter 74 comprises a buffer driver DV, an integrator comprising resistor r13 and capacitor C, output resistor r14 and an amplifier AMP. The filter 74 generates a voltage based on the data DO. Namely, when the output data DO=1, the filter output rises toward $(5+A)$ volts. When the output data DO=0, and the filter output falls toward $(5-A)$ volts. The value of A is based on the ratio of the resistor r14 and the resistor r15. In short, the filter 74 provides an output signal having high frequency components filtered by the integrator. The input to the RC network r13 and C is clipped at a low level by the write control signal DWS from the controller 5.

Reference numeral 75 identifies a comparison amplifier. The comparison amplifier 75 compares the focus position signal FPS with the reproduce signal FPS' and provides an output signal varying in accordance with this comparison. The output of amplifier 75 is high impedance when the track position signal TPS is larger than the reproduce signal TPS'. When the focus position signal FPS is smaller than the reproduce signal FPS', the output is a low impedance. This output signal is provided to the input terminal DIN of memory 70.

Reference numeral 76 identifies a clock generator. The clock generator includes a crystal oscillator an generates a clock CL shown in FIG. 8.

Reference numeral 77 identifies a memory controller which generates the address count clock ACL, a chip select signal CS and a write enable signal WE. The chip select CS and write enable WE are controlled by the WRM signal as shown in the following table.

| WRM | High | Low |
|-----|------|-----|
| WE  | $\overline{TCL}$ | Low |
| CS  | High | $\overline{TCL}$ |

Memory controller 7 comprises a quinary counter 770 which counts the clock CL, an OR gate 771, an inverter 772, an NAND gate 773, and an inverter 774. Counter 770 is a synchronous counter that generates the address clock ACL shown in FIG. 8. The synchronous counter 770 also generates a timing clock TCL shown in FIG. 8. The OR gate 771 performs a logical OR operation between the mode signal WRM and the timing clock TCL, and generates the write enable signal WE when the mode signal WRM is a logic low. The logic low state of WRM enables data to be written into the memory 70. The NAND gate 773 has an input connected to receive the mode signal WRM and another input connected to receive the timing clock TCL. The output of NAND 773 corresponds to the chip select signal CS when the mode signal WRM is a logic high. The logic high state of WRM enables data to be read from the memory 70. The timing clock TSL is applied to a load terminal of the counter 770 in order to operate the counter as a quinary counter.

Reference numeral 11 identifies a synchronous, motor controller that controls a spindle motor 1a to rotate at a constant speed. The motor controller 11 synchronizes the velocity and phase of the spindle rotation according to a position signal of the spindle motor 1a and the clock signal CL.

Reference numeral 12 identifies a motor driver which drives the motor 1a in accordance with the output signal from the motor controller 11.

ii. Operation

Referring to FIGS. 7 and 8, the clock CL is applied to the synchronous counter 770 of the memory controller 77. The synchronous counter 770 frequency divides the clock CL by five and respectively produces the ACL and TCL signals from terminals QB and RCO. The address clock ACL is applied to the lower digit counter 73a which counts on the rising edge on the address clock ACL. The timing clock TCL is generated one clock cycle later than the center of the period of the address clock ACL.

Therefore, since the write enable WE and chip select CS are generated during the same clock cycle, the output data D0 stored in the addressed location of the memory 70 is chopped by the chip select signal CS and the write enable signal WE as shown in FIG. 8.

The track position signal TPS has a sine wave shape as shown in FIG. 8. The track position signal TPS is received from the head portion circuit 6 (FIG. 3) and applied to one of the input terminals of the comparison amplifier 75 (FIG. 7). Initially, all data stored in the memory 70 is a logic low. Therefore, the reproduce signal TPS' provided by the filter 74 is also initially a logic low.

The comparison amplifier 75 generates a logic high when the track position signal TPS is larger than the reproduce signal TPS', and generates a logic low when the track position signal TPS is smaller than the reproduce signal TPS'. The data generated by the comparison amplifier 75 is applied to the memory 70 as write data, DIN.

In a write mode, the controller 5 sets the mode signal WRM to a logic low. The memory 70 therefore receives the write enable signal WE as shown in FIG. 8 through the inverter 772. The memory 70 stores the data from the comparison amplifier 75 at the address provided by the address generator 73 each time the memory 70 is write enabled by the signal WE. For example, when the write data (DIN) is a logic 1 while the address is $A_{L+1}$ is applied to the memory 70, the address data $D_{+1}$ changes to a logic one from a logic zero in response to the write enable signal becoming active. Accordingly, the memory output DO also changes to a logic one from a logic zero. Namely, the filter output TPS' increases when the input data is logic one, and decreases when the output data is a logic zero. Therefore, as shown in FIG. 8, since the reproduce signal TPS' is initially smaller than the track position signal TPS, the output of the comparison amplifier is a logic high. This data is stored in the memory 70 by the write enable signal WE; thus, increasing the level of the reproduce signal TPS'. As a result, the reproduce signal TPS' follows the level of the track position signal TPS.

Since the address of the memory 70 changes as explained above, data representing the waveform of the track position signal TPS is stored in the memory 70. The data is then provided as an output on line D0 as a signal TPS'. Namely, as the write data DIN is formed into the shape as shown in FIG. 8 relating to the track position signal TPS, the reproduce signal TPS' from the filter 74 varies according to the memory output D0 and follows the track position signal TPS. This is similar to storing the results of delta modulation of a analog waveform. In FIG. 8 a rough TPS' is shown for ease of explanation. Actually, the TPS' signal is a smooth signal similar to the input TPS. This is because there are approximately 16,000 write enable pulses generated during one period of a track position signal TPS. There are therefore 16,000 data points stored in memory 70 during a period of a signal TPS. The clock CL from the clock generator 76 is a reference clock for the spindle motor 1a. Therefore, the delta modulated TPS signal for a single turn of the optical disk 1 is stored in the memory 70 in synchronization with the rotation of the optical disk 1.

In the read mode, controller 5 sets the mode signal WRM to a logic high. Consequently the chip select signal CS is applied via the NAND gate 773 to the memory 70. The stored data is output from memory 70 on signal line D0 as shown in FIG. 9, and the filter 74 provides the output TPS'. During this operation no writing is performed since the write enable signal WE is not active.

As seen from the above, the vibrating control unit 70 can be realized using an economical comparison amplifier and an economical filter. Use of these components allows the writing and reading of the amplitude of an analog waveform without using expensive A/D or D/A converters. Accordingly, the cost of the system is significantly reduced. Because the controller 5 does not have to monitor A/D conversions, its processing load is lessened; resulting in an less expensive structure. As discussed above, the light beam is vibrated via the vibration control unit 7.

3. Automatic Offset Adjustment Operation

Figure 9A:
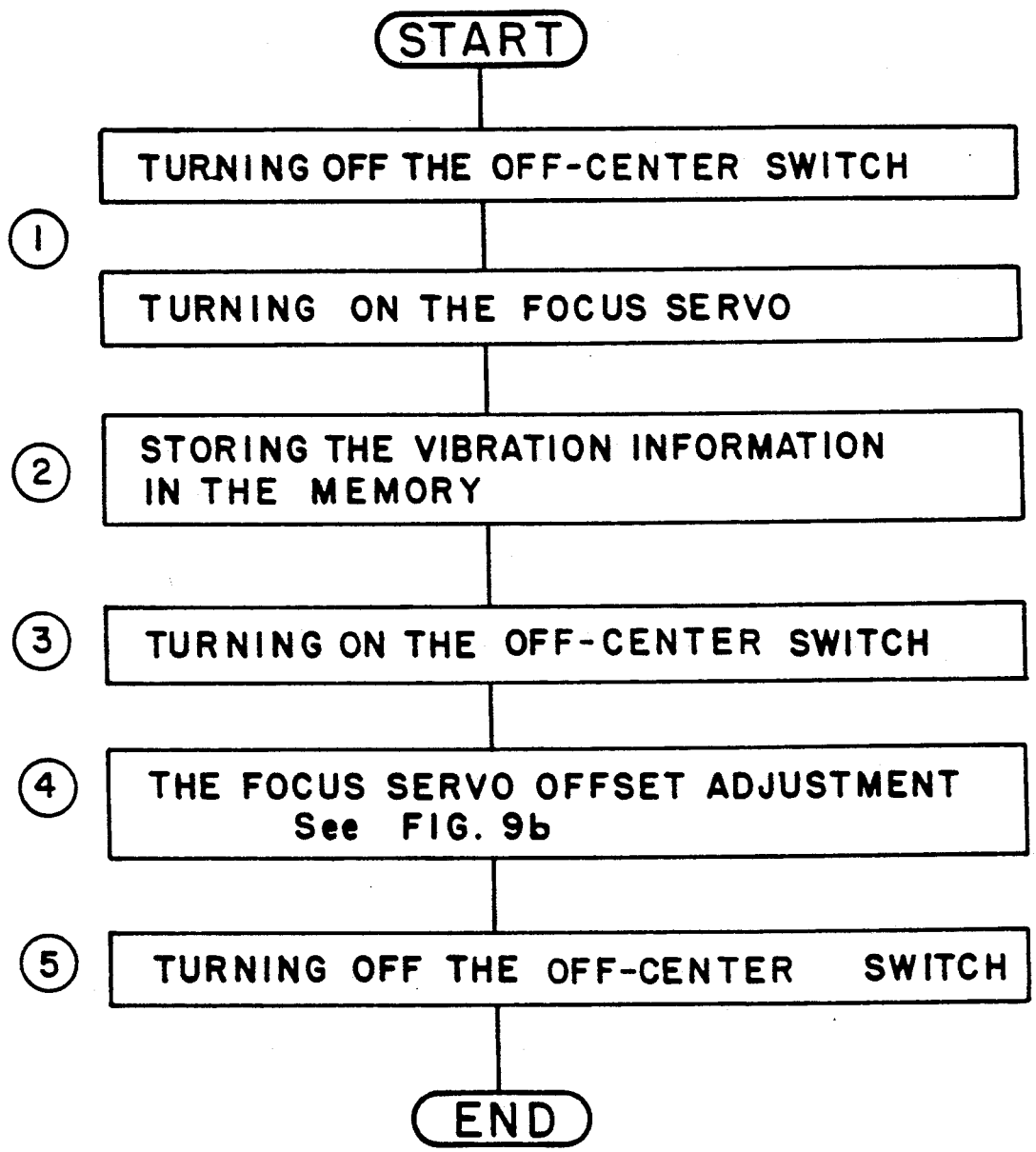
FIGS. 9a through 9c are flow charts illustrating the processing for determining the optimum offset level performed by the microprocessor of FIG. 4.
Figure 9B:
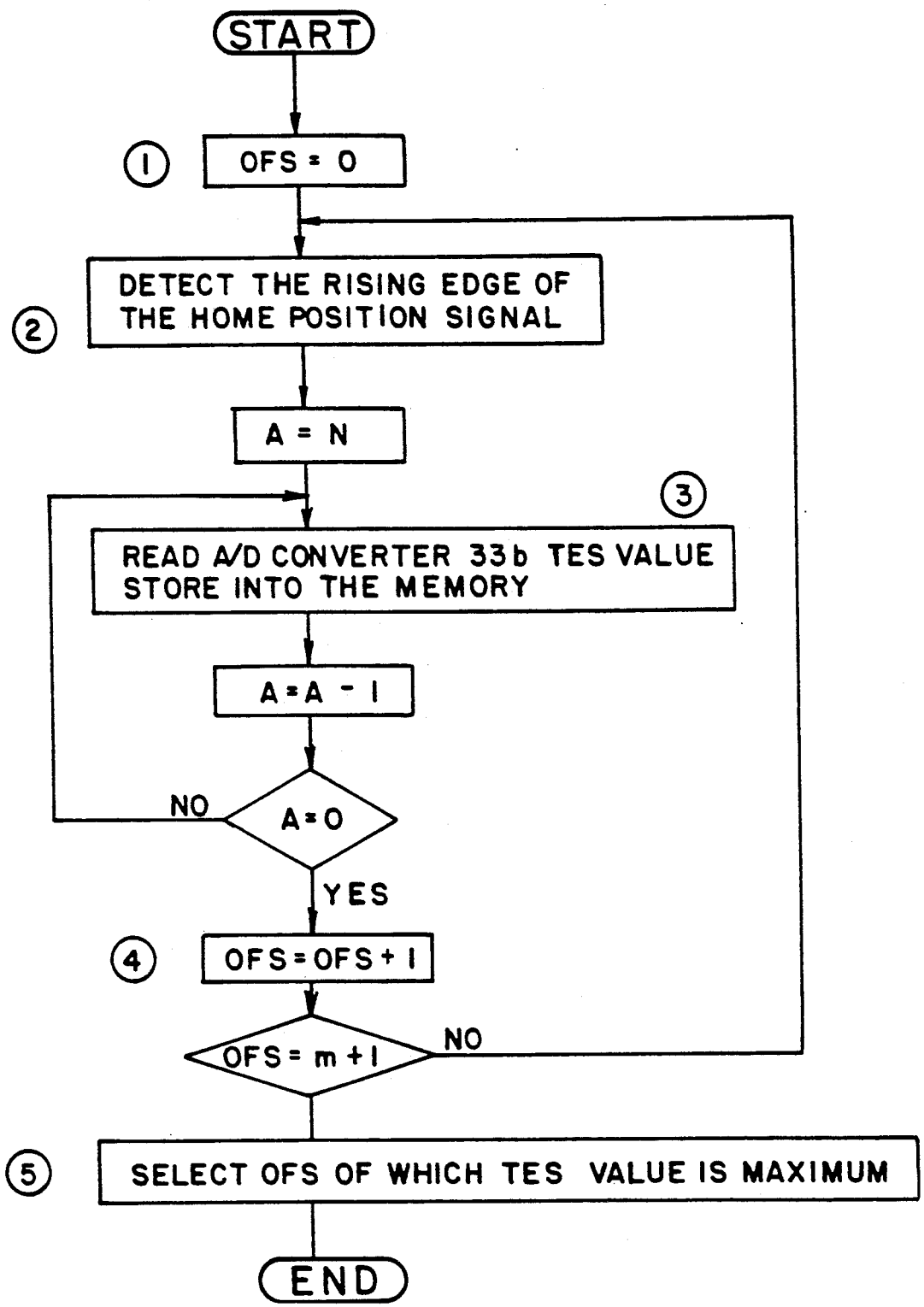
Figure 9C:
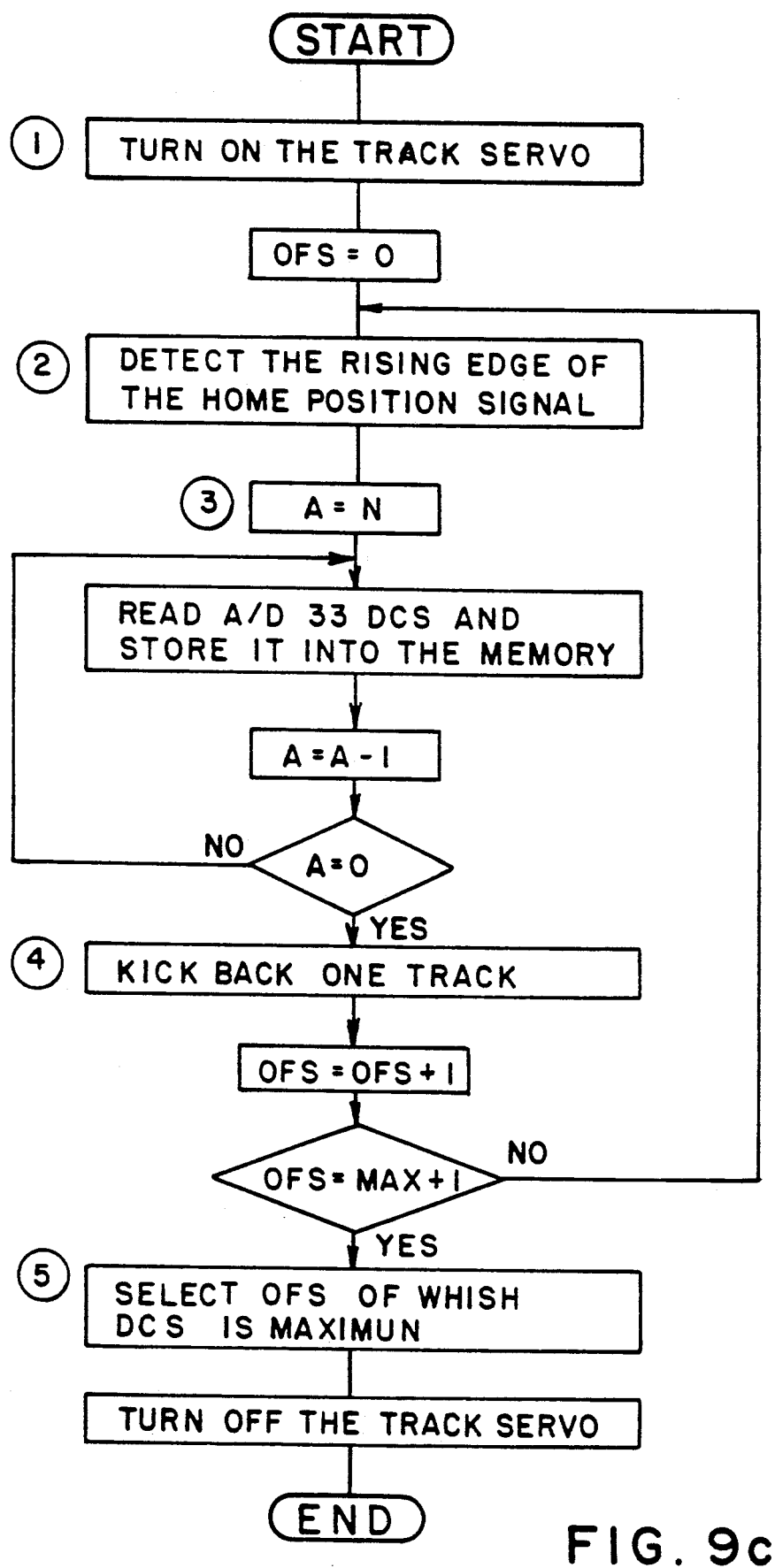

FIGS. 9a through 9c are flowcharts illustrating the processing for determining the optimum focus offset level performed by controller 5. This processing is discussed with reference to the flowcharts and FIG. 3.

Step 1

The controller 5 turns off the off-center signal HFS which turns off the switch 7a. This inhibits the reproduce signal TPS' from being applied to the amplifier 39a. Then, the controller 5 turns on the focus-servo-on signal FSV. This causes the focus servo switch 45 to connect a path between the phase compensating circuit 44 and the focus offset circuit 46, and starts focus servo control. Accordingly, the focus actuator 22 is controlled in accordance with the focus error signal FES.

Step 2

The controller 5 stores vibration information VVS in the memory 70 of the vibration control unit 7. Namely, the controller 5 sets the mode signal WRM to a logic high (which indicates the write mode), and sets the write control signal DWS to a logic low in order to clip the output of the driver DV (FIG. 7).

Since the lock-on switch 38 connects the RPS signal to the amplifier 39a, and the light beam is locked by the track actuator 21, the track position signal TPS is, for example, 5 volts, and the output of the comparison amplifier 75 is a high impedance. As a result, vibration information VVS sent from the controller 5 is applied to the input terminal DIN of the memory 70 and then the information VVS is stored in the memory 70. The vibration information VVS is stored in the memory 70 in order to obtain a reproduce waveform that can be used to cause about 10 cycles of vibration for one disk rotation.

Step 3

The controller 5 turns on the off-center signal HFS which closes switch 7a. Furthermore, the controller 5 sets the mode signal WRM to a logic low (which indicates the read mode), and sets the write control signal DWS to a logic high in order to set the low clipping voltage. Therefore, the vibration reproduce signal FPS', based on the vibration information stored in the memory 70, is applied to the amplifier 39a via the switch 7a. Thereby, the track actuator 21 drive signal TDV includes a vibration waveform so that the light beam vibrates in the radial direction of the optical disk 1.

Step 4

The controller 5 executes focus servo offset adjustment processing, as indicated in FIG. 9(B), under the above condition as a result, accurate offset adjustment is realized since a sufficient S-shaped track error signal can be obtained during a rotation of the optical disk one.

Step 5

After completing the focus servo offset adjustment processing of FIG. 9(B), the controller 5 turns off the off-center signal HFS and the switch 7a in order to stop the desired vibration of the light beam.

a. The Focus Offset Level Adjustment for Seek Mode

FIG. 9(B) is a flowchart illustrating the processing for adjusting the focus offset level performed by the controller 5.

Step 1

The controller 5 initially sets the focus offset level OFS to a logic low.

Step 2

Figure 10:
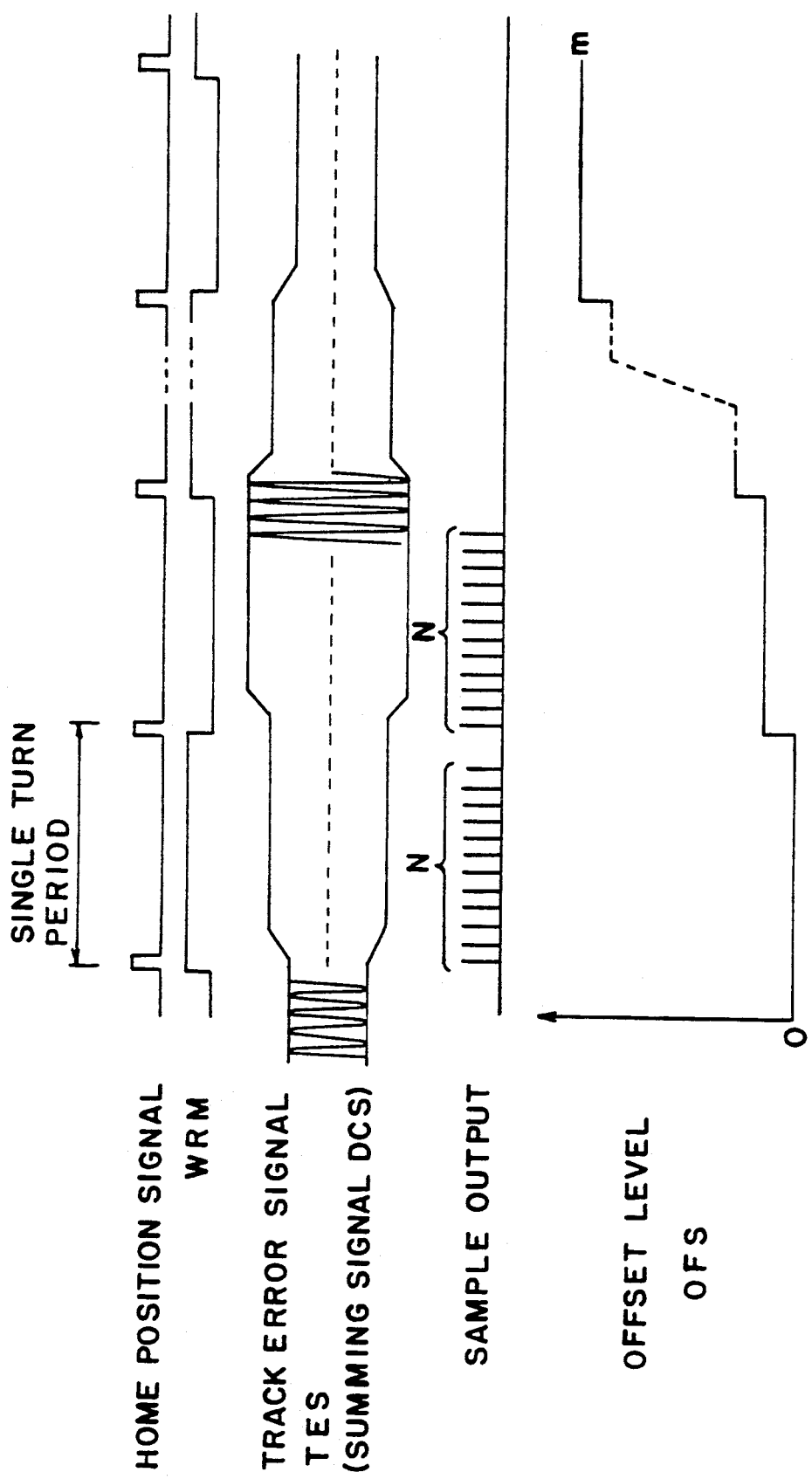
FIG. 10 is a timing chart illustrating the relationships of various signals of the FIG. 3 circuit during the selection of an optimum focus offset level.

The controller 5 applies the focus offset level OFS to the register 461 of the focus offsetting circuit 46 (FIG. 5b) on the rising edge of the home position signal (FIG. 10). The home position signal occurs once for each turn of the optical disk one. The focus offset level is then applied through the D/A converter 462 to the adding amplifier 460. A setting value "N" is set the number of data points "A" stored in the memory 70 during a single turn of the optical disk 1.

Step 3

The controller 5 reads the digital track error signal TES from the A/D converter 33b and stores it at a location in table 5b (FIG. 3) corresponding to the current focus offset value as set by the controller 5. The controller 5 updates a number of remaining samples "A" to "A-1" and determines if A=0. If A≠0, the controller 5 samples the output of the A/D converter 33d. Therefore, the amplitude is sampled N times for the offset during a single turn of the optical disk.

Step 4

The controller 5 updates the focus offset level OFS to OFS+1. This offset is then compared with the maximum value m+"1" to determine if the focus offset level has exceeded the maximum value m. If it does not exceed the maximum value m, operation returns to step 2.

Step 5

If the focus offset level exceeds the maximum value m, then amplitude measurement is completed and N amplitude measurements are stored in the memory 5b (FIG. 3) for each focus offset level from 0 to m.

The controller 5 compares the respective amplitudes stored in the memory 5b to obtain the maximum amplitude and the corresponding focus offset level. The controller 5 sets this focus offset level in the register 461 (FIG. 5b) as the focus offset level Vs for the seek mode.

As explained previously and is shown in FIG. 10, the focus offset level OFS is sequentially changed for each turn of the optical disk. The amplitude of the track error signal TES for each focus offset level is sampled for N times in order to determine the focus offset level corresponding to the maximum amplitude of TES. With this operation, since the light beam is vibrating, a sufficiently S-shaped track error signal TES can be obtained for a single turn of the optical disk and the amplitude of the track error signal TES can be accurately measured.

b. The Focus Offset Adjustment for Read/Write Modes

To improve the read/write characteristics, the focus offset level Va for the read/write modes can be obtained during the read mode through processing shown in FIG. 9C. The processing includes measuring the summing signal DCS after step 5 in FIG. 9A. Referring to FIG. 9C, after the step 5 in FIG. 9A, the controller 5 performs the following processing steps.

Step 1

The controller 5 turns on the track-servo-on signal TSV. This closes the servo switch 36 and activates the track servo mechanism unit. The controller 5 initially sets the focus offset level OFS to a logic low.

Step 2

The controller 5 applies the focus offset level OFS to the register 461 of the focus offsetting circuit 46 in accordance with the falling edge of the home position signal (FIG. 10). The focus offset level is added to the focus actuator 22 driving signal via D/A converter 462 and operational amplifier 460 of circuit 46 shown in FIG. 5c. A number of samples "A" during a single turn of the optical disk is initially set to a value N in an internal register of the controller 5.

Step 3

The controller 5 reads the summing signal DCS from the A/D converter 34 and stores this value at a location in table 5c (FIG. 3) corresponding to the focus offset level set by the controller 5. The controller 5 then subtracts the "1" from the offset value (initially A) stored in the internal register and sets the internal register to the subtracted value. Then, the controller 5 determines if the subtracted value is equal to 0. The controller 5 therefore repeats step 3 N times; that is, samples the summing signal DCS N times.

Step 4

When the optical disk has tracks of a spiral type, after sampling the summing signal DCS, the controller 5 moves the beam back one track and thus returns the light beam to the initial track. The controller 5 next updates the focus offset level OFS to OFS+1, and compares the focus offset level to one more than the maximum offset value m.

Step 5

If the focus offset level has reached the maximum offset level, the measurement process is completed. The controller 5 then selects the optimum focus offset level for the read/write mode. To do this, the controller 5 compares the stored values of the summing signal DCS and selects the maximum value and the corresponding focus offset value OFS. In short, the focus offset value OFS is sequentially changed for each turn of the disk and the amplitude of the summing signal DCS for each focus offset level is sampled N times in order to obtain the focus offset level corresponding to the maximum amplitude of the summing signal DCS.

If the focus offset level determined via the above is denoted as Vd, the controller 5 obtains the focus offset level Va for the read/write mode in accordance with the following formula:

$$Va = (Vs + d \cdot Vd)/(1 + c) \qquad (10)$$

Where $V_a$ is the optimum read/write mode offset level, $V_s$ is the optimum seek mode offset level, and c is a constant which is empirically determined for each system. The optimum values for $V_a$ and $V_s$ are measured for a system to set the value for c. The value for c is substantially the same for systems employing the same optical head mechanism. Thus, $V_a$ can be determined in other systems using the empirically determined value for c.

The maximum focus offset level Vd is the optimum focus offset level for the read mode. In accordance with the present invention, the focus offset is set to an intermediate value between Vr and Vw as shown in FIG. 1b. This value is used as the optimum focus offset level in the write mode. Accordingly, the value of Va is obtained form the calculation indicated above. The controller 5 stores this focus offset level in table 5a (FIG. 3) as a second focus offset level Va for use during read-/write modes, thereby completing the adjustment process.

E. Operation of the Preferred Embodiment

The operation of the preferred embodiment is explained with reference to FIGS. 2, 3, 6b and 12.

1. Focus Set Up

Operation of the preferred embodiment starts with either a power-on sequence of the system or by placing another optical disk into the optical disk access system after power-on. Power-on sequence is discussed in copending U.S. application Ser. No. 202,673 filed June 6, 1988 which is hereby incorporated by reference. Then the system adjusts the focus of the optical mechanism 2. The focus adjustment is performed by operating the focus servo mechanism so that the focus point is controlled to a desired location. The focus position control signal RPS is used during this focus adjustment operation. Namely, the controller 5 turns on the switch 3B (switch 380 in FIG. 6b), by turning on the lock-on signal LKS. Switch 36 is turned off. Then, the controller 5 gradually changes the level of the lock-point-moving signal LMS. The focus actuator 22 is therefore driven through the power amplifier 47.

The controller 5 monitors the focus zero crossing signal FZC provided by the zero crossing detector 43a. When the compensated errors signal $FES_c$ has a zero potential, the focus zero cross signal FZC is generated. The controller 5 turns off switch 3B by turning off the lock-on signal LKS in response to detecting the focus zero cross signal FZC.

Simultaneously, controller 5 closes switch 45 by turning on the servo-on-signal FSV. The switch 45 closes the focus servo loop from the FES generating circuit 40 to power the amplifier 47. This places the focus actuator 22 under focus servo control using the focus error signal FES.

2. Track Set-Up

After completing the focus set-up operation, the optical disk access system performs a track servo set-up operation in order to follow a track of the optical disk.

Step 1

Figure 11:
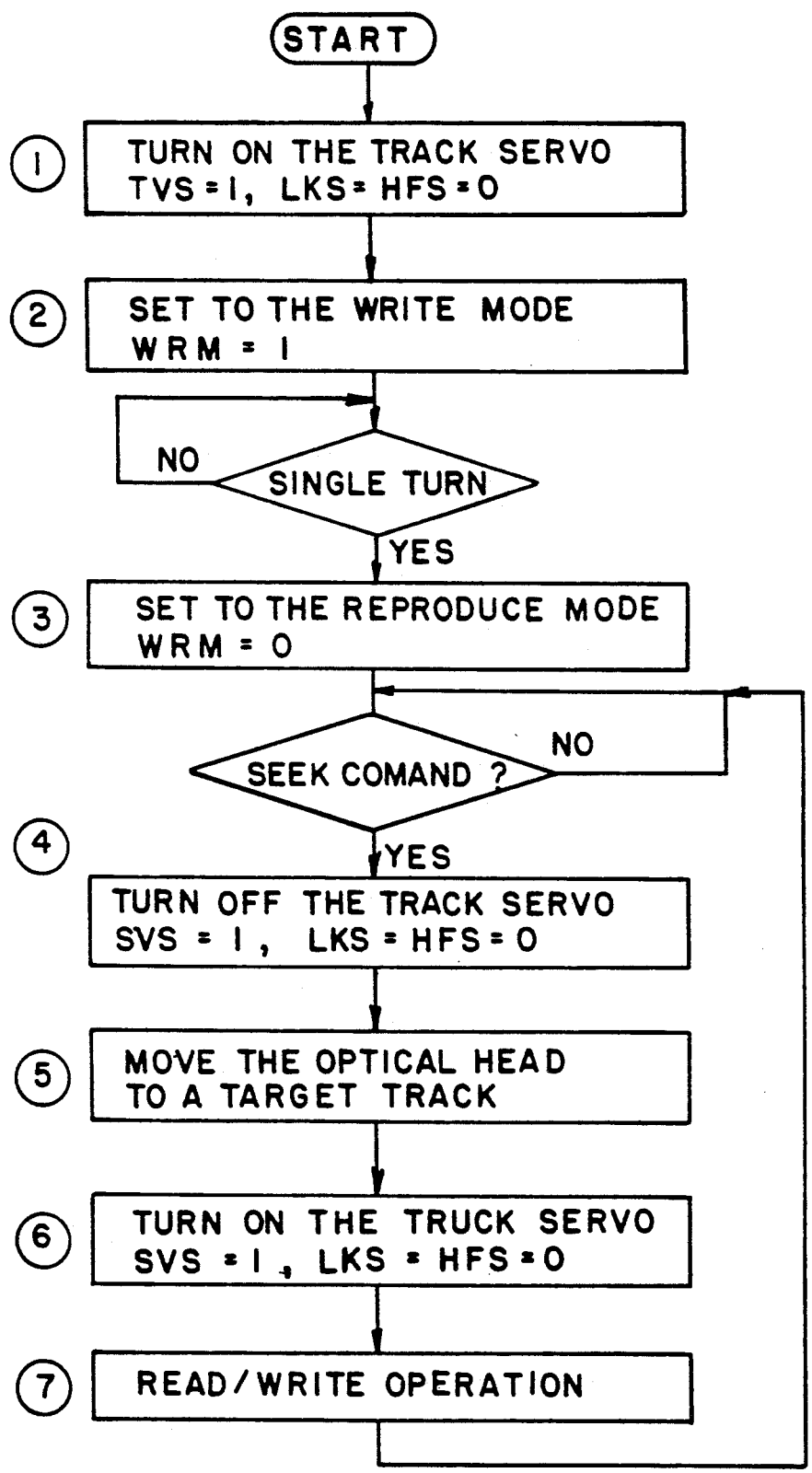
FIG. 11 is a flow chart illustrating the processing performed by the microprocessor in FIG. 3 during regular operation of the optical disk access system of the present invention.

Referring to FIG. 11 controller 5 turns on the track servo control by setting the track servo signal TSV to a logic high. During this operation, the controller 5 uses the focus offset level Vs for the seek mode. Namely, the track servo signal TSV is set to a logic high ("1"), closing switch 36. Closing switch 36 enables generation of the servo loop track error signal TES. The lock-on signal LKS and off-center signal HFS are logic low ("0"). Consequently, lock-on switch 38 and off-center switch 7a are off (e.g. open). With the system in the above condition, the servo loop operates so that the light beam follows a track.

Step 2

While the servo loop operates to follow a track, the light beam actually moves to follow the track by means of the track actuator 21. Also, the focus position signal FPS provided by position sensor 29 has a waveform corresponding to the motion of the track actuator 21. Namely, an off-center waveform is output so that the light beam is driven off the track to intentionally generating large track errors. In this case, controller 5 sets the mode signal WRM to a logic high ("1") to designate the write mode of the memory controller 77 in vibrating control unit 7.

Therefore, as indicated in FIG. 8, the focus position signal FPS provided by the position sensor 29 is written into the memory 70, as off-center information, a plurality of times for a single of the optical disk one. Namely, the vibration information VVS mentioned previously is updated in the memory 70.

The controller 5 sets the mode signal WRM to a logic high in accordance with the home position signal (FIG. 10). The mode signal WRM remains a logic high until the next home position signal arrives.

Step 3

After one turn of the optical disk is completed, the controller 5 sets the mode signal WRM to a logic low. This designates the read mode of the vibrating control unit 70. Therefore, while the mode signal WRM was a logic high, the focus position signal FPS for a single turn was written into the waveform memory 70. When the mode signal WRM is a logic low, and the waveform memory 70 outputs the reproduce waveform FPS', and the off-center switch 7a is off. Therefore, an off-center waveform is not applied to the track servo controller 3. Consequently, the light beam is driven to follow a track via the track servo loop. The controller 5 then waits for a seek instruction.

Step 4. Seek Operation

Referring to FIG. 11, step 4, when a seek instruction is received by the controller 5, the controller 5 turns off the track servo operation. To do this, the controller 5, turns off the track servo signal TSV (i.e., sets it to a logic low) to open servo switch 36. This opens the track servo loop. The controller 5 also sets the lock-on signal LKS and off-center signal HFS to a logic high. Accordingly, the lock-on switch 38 and the off-center switch 7a are closed. The returning power signal RPS of the returning power generating circuit 37 is therefore applied to a positive input of amplifier 39a. The reproduce focus position signal FPS' provided by memory 70 is applied to a negative input of amplifier 39a. Consequently, actuator 21 of optical head 2 is driven in accordance with the waveform of the track position signal TPS combined with RPS which functions as a feedback signal for the track actuator 21. The light beam BS is driven along a path based on the stored off-center information.

Step 5

The controller 5 then moves a step motor 9 (FIG. 1b) so as to move the optical head to 2a target track.

Step 6

The controller 5 next turns the track servo operation on. To do so, the controller 5 sets the track servo signal TSV to a logic high. This closes servo switch 36 and begins track servo control. Namely, the track error signal TES (generated by the TES generating circuit 30 and gain/phase controlled by the AGC circuit 32 and phase compensating circuit 35), is applied to amplifier 39a through the servo switch 36. This corresponds to the track servo loop.

Simultaneously, the controller 5 sets the lock-on signal LKS and the off-center signal HFS to a logic low. This opens the lock-on switch 38 and the off-center switch 7a. This prevents the returning power signal RPS and the reproduce signal FPS' from being applied to the amplifier 39a.

Track servo control is started with a low frequency track error signal TES. This is because the track servo control was turned off while the optical head 2 was being moved to the target track. The otherwise large track error signals that would be generated during a seek therefore do not affect the track servo operation. As a result, the servo pull-in time is shortened.

Step 7

Figure 12:
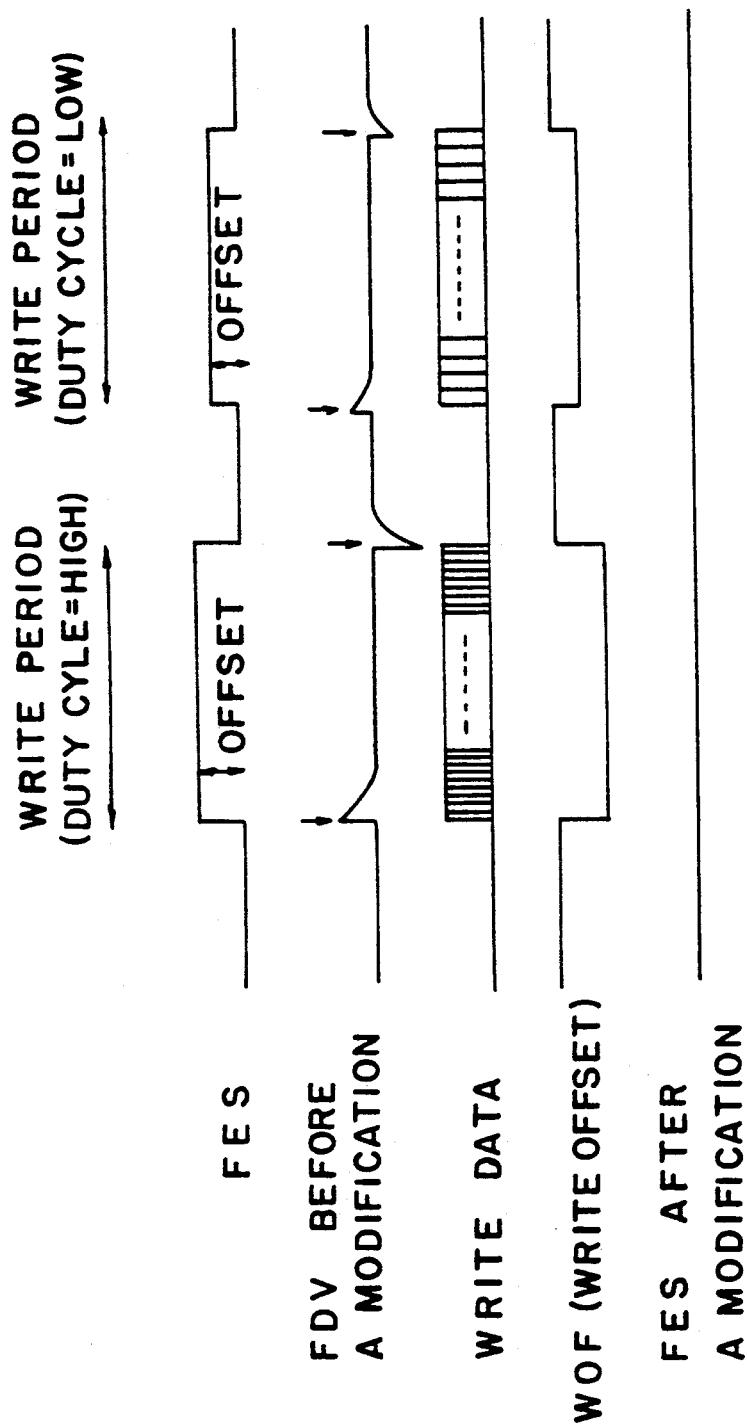
FIG. 12 is a timing chart illustrating the relationships of various signals of the FIG. 3 circuit during a write operation of the present invention.

If the controller 5 receives a read or a write instruction, the controller 5 changes the focus offset level to Va and then executes the read or the write operation. Referring to FIGS. 12 and 5a, during the period excluding the write mode, the write offset WOF is zero. Therefore, only the focus error signal FES is applied to the phase compensating circuit 44. During this period, focus servo control is carried out in accordance with the following equation.

$$FES = \frac{(SVa + FVc) - (SVb + SVd)}{SVa + SVb + SVc + SVd} \quad (11)$$

When a write operation is carried out the focus error signal FES is expressed by the following equation (11). In equation 11, the four outputs of the photosensors 26 during the write operation are expressed as $SV_a(w)$ through $SVd(w)$.

$$FES = \frac{(SVa(w) + SVc(w)) - (SVb(w) + SVd(w))}{SVa(w) + SVb(w) + SVc(w) + SVd(w)} = \alpha \quad (12)$$

The value $\alpha$ is an offset value and is proportional to the write data. Namely, the offset $\alpha$ is large during write operations with data having a high duty cycle, but is low during write operations with data having a low duty cycle. The write offset generating circuit 42b (FIG. 5a) generates the offset $\alpha$ by filtering the write data. The filtered offset $\alpha$ is subtracted from the focus error signal FES by write offset correcting circuit 42 (FIG. 5a). The offset in the focus error signal FES due to written data is thereby cancelled. Write operations are therefore performed with an accurate focal point. This enables write operations to be executed accurately with sufficient light intensity. In addition, since the offset is generated based upon the write data, the write offset is proportional to the duty cycle of the write data. Thus, the offset of the focus error signal FES can be accurately cancelled.

After step 7 is completed, the operation returns to step 4.

In the above embodiment, the optimum focus offset level for read and write operations is set to the same level. It is, however, also possible to have separate offset levels; for example, a write optimum focus offset level Vw and read optimum focus offset level Vr as shown in FIG. 1b. To do this, the circuit can be used, but the focus offsetting circuit 46' of the type shown in FIG. 5c must be modified. For example, the circuit 46' should be modified to include a well-known level changeover circuit.

It is also possible to use read/write commands to change the focus offset level instead of the seek command as in the above embodiment.

While the present invention has been described with respect to read and write optical disk systems, only one of the read or write functions need be used. In addition, the present invention can be applied to a transparency type optical disk. Furthermore, the focus error can be detected by other methods such a critical angle detecting method. Also, the beam and focus position can be detected using other methods.

Regarding the vibrating control unit, the vibration information is stored in the unit 7 for vibration control in the above embodiment. However, because vibration control unit 7 is not used before the off-center control, the memory in the vibration signal generator may be provided separately. When a servo motor is used as the transfer motor 9, the light beam may be vibrated applying the vibration signal to the servo motor.

Regarding the selection of the optimum focus offset levels, the measurement of the track error signal and the summing signal can be done simultaneously, depending upon the speed of the controller 5. When selected simultaneously, the track error signal TES and the summing signal DCS may both be sampled while only moving the focus offset level through one set of (i.e. one ramp up process as shown in FIG. 10) changes.

While the present invention has been described with respect to a preferred embodiment, it is understood that the scope of the present invention is not limited to, and instead is defined by the following claims.

What is claimed is:

1. An optical disk access system having a seek mode and another mode, for accessing an optical disk, comprising:
    first optical means for illuminating the optical disk with a light beam spot having a focus position, and for changing the focus position of the beam spot in response to a focus control signal;
    optical head means for receiving light reflected from the optical disk and for providing receiving light signals varying in accordance with the intensity of the received reflected light;
    focus error means for providing a focus error signal responsive to at least one of the receiving light signals;
    focus servomechanism means for generating the focus control signal in response to the focus error signal and at least one of a plurality of predetermined focus offset levels; and
    control means, operatively connected to said focus servomechanism means, for detecting the seek mode and the another mode, for selecting and providing, as the at least one of the predetermined focus offset levels, a first one of the predetermined focus offset levels in accordance with the seek mode and a second one of the predetermined focus offset levels in accordance with the another mode.

2. An optical disk access system according to claim 1, further comprising:
    second optical means for moving the beam spot in a radial direction of the optical disk based on a track drive signal which is responsive to a track error signal;
    track servo means for generating the track error signal in accordance with at least one of the receiving light signals; and
    first focus offset level generating means for generating a first group of the predetermined focus offset levels, for detecting track error signals responsive to the first group of predetermined focus offset levels, and for determining the first one of the predetermined focus offset levels corresponding to a maximum one of the detected track error signals.

3. An optical disk access system according to claim 2, further comprising:
    means for generating a summing signal in response to at least one of the receiving light signals so that the summing signal corresponds to a total amount of light reflected from the optical disk; and
    second focus offset level generating means for generating a second group of the predetermined focus offset levels, for detecting summing signals responsive to the second group of predetermined focus offset levels, and for determining the second one of the predetermined focus offset levels corresponding to a maximum one of the detected summing signals.

4. An optical disk access system according to claim 3, wherein said first focus offset level generating means includes:

first offset level source circuit means for generating the first predetermined focus offset level in the seek mode, and wherein said second focus offset level generating means includes:

second offset level source circuit means for generating the second predetermined focus offset level in the another mode, and wherein said focus servomechanism means comprises:

combining circuit means, having inputs and an output, for combining a signal received at a first one of said inputs and the focus error signal; and switch circuit means for selectively connecting one of said first and said second offset level source circuit means to said first input of said combining circuit means in response to a control signal provided by said control means, so as to provide said at least one of the predetermined focus offset levels as said output of said combining circuit means.

5. An optical disk access system according to claim 3, wherein said focus servomechanism means comprises:

register means for receiving and storing data provided by said control means;

digital to analog converter means for converting data stored in said register means to an analog signal; and combining circuit means for combining the focus error signal and the analog signal from said digital to analog converter, and wherein said control means includes means for providing said at least one of the predetermined focus offset levels to said register means during the seek mode and provides said second one of the predetermined focus offset levels to said register means during the another mode.

6. An optical disk access system according to claim 3, further comprising:

vibration control means for generating a vibration signal;

means for combining the vibration signal and the track error signal and for providing the combined signal as the track drive signal so as to vibrate said beam spot in a radial direction of the optical disk;

changing means for changing the at least one of the predetermined focus offset levels provided to said focus servomechanism means;

means for measuring a plurality of amplitudes of the track error signal for each focus offset level provided by said changing means.

7. An optical disk access system according to claim 6, wherein said focus error means includes:

means for varying the focus error signal in response to data written to the optical disk.

8. An optical disk access system having a seek mode and another mode for accessing an information pattern on an optical disk, comprising:

optical means for illuminating the optical disk with a beam spot of light having a focus position, in accordance with a focus position signal defining the focus position of the beam spot;

optical head means for receiving light reflected from the optical disk and for providing receiving light signals varying in accordance with the received reflected light;

focus error means for providing a focus error signal responsive to at least one of the receiving light signals;

focus servo control means for generating the focus position signal in accordance with the focus error signal and a focus offset level;

track error means for providing a track error signal responsive to at least one of the receiving light signals;

track servo control means for controlling a radial position of the beam spot of light in accordance with the track error signal and a vibration control signal;

vibration control means for providing the vibration control signal so that the beam spot of light vibrates in the radial direction of the optical disk;

means for providing the focus offset level and for varying the focus offset level while the beam spot of light is vibrating;

means for detecting the track error signal while the beam spot of light is vibrating; and means for determining the focus offset level when the track error signal has a maximum value, and for providing this detected focus offset level as the focus offset level to the focus servo control means in accordance with the vibration control signal.

9. An optical disk access system according to claim 8, wherein said focus error means includes means for varying the focus error signal in accordance with data written to the optical disk.

10. An optical disk access system for accessing an optical disk, comprising:

optical head lighting means for illuminating the optical disk with a beam spot of light having a focus position and for producing a receiving signal varying in accordance with an amount of light reflected from the optical disk;

focus servo means for generating a focus error signal in accordance with the receiving signal and for controlling the focus position of the beam spot of light in accordance with the focus error signal and a focus offset level;

track servo means for generating a track error signal in accordance with the receiving signal and for controlling a radial position for the beam spot of light on the optical disk;

position detector means for detecting a radial position of the beam spot of light and for providing an output signal varying in accordance with said detection;

memory means for storing the output signal as off-center information;

means for vibrating the beam spot of light in the radial direction of the disk in accordance with the off-center information;

means for providing and varying the focus offset level;

means for measuring a plurality of amplitudes of the track error signal at various focus offset levels while the beam spot of light is being vibrated in accordance with the off-center information;

means of detecting a focus offset level corresponding to a maximum amplitude of the track error signal and for providing the detected focus offset level as the focus offset level applied to said focus servo means.

11. An optical disk access system according to claim 10, wherein said focus servo means includes means for varying the focus error signal in accordance with data written to the optical disk so as to compensate the focus error signal for variations in the focus error signal caused by data written to the optical disk.

12. An optical disk access system having a plurality of modes for accessing an optical disk, comprising:
- means for providing a light beam spot on the optical disk in accordance with a focus drive signal and a track driving signal;
- light means for receiving light reflected from the optical disk and for providing light signals varying in response to an amount of received reflected light;
- means for generating a focus error signal based on the light signals;
- means for generating a compensated focus error signal based on the focus error signal and data written to the optical disk;
- means for generating a track error signal based upon the light signals;
- means for providing a focus offset signal in response to a value of a first control signal;
- means for providing, in response to a second control signal, the track driving signal being selectively responsive to one of a vibration control signal varying so as to cause the light beam spot to vibrate in a radial direction of the optical disk, at least one of the light signals, and the track error signal;
- means for providing the second control signal so as to cause the track drive signal to vibrate the beam spot in the radial direction of the optical disk and simultaneously detecting the track error signal, for varying a value of the first control signal so as to vary the focus offset signal and for selecting a first value of the first control signal producing a focus offset signal corresponding to a maximum value of the detected track error signal;
- means for providing the second control signal so as to cause the track driving signal to drive the beam spot in response to one of the light signals;
- means for providing the second control signal so as to cause the track driving signal to drive the beam spot in response to the track error signal;
- means for detecting the modes and for varying the first control signal in accordance with corresponding ones of the modes; and
- means for providing a focus drive signal in response to the focus offset level and at least one of the light signals.

13. An optical disk access system according to claim 12, wherein said light means includes summing means for generating one of the light signals being responsive to a total amount of received light reflected from the optical disk, and wherein said system further comprises:
- means for providing the second control signal so as to cause the track driving signal to vibrate the beam spot in the radial direction of the optical disk and to simultaneously detect the one of the light signals generated by said summing means, for varying the first control signal so as to vary the focus offset signal and for selecting a second value of the first control signal providing a focus offset signal corresponding to a maximum of a detected one of the light signals generated by the summing means.

* * * * *

UNITED STATES PATENT AND TRADEMARK OFFICE
CERTIFICATE OF CORRECTION

PATENT NO.  : 5,077,719
DATED       : December 31, 1991
INVENTOR(S) : Yanagi et al.

It is certified that error appears in the above-identified patent and that said Letters Patent is hereby corrected as shown below:

Col. 10, line 4, change "2b" to --42b--.

Col. 12, line 49, change "38a" to --39a--;

Col. 12, line 55, change "38a" to --39a--.

Col. 15, line 27, change "D+$_1$" to --$D_{L+1}$--.

Col. 20, line 13, change "low" to --low.--.

Signed and Sealed this

Twelfth Day of May, 1992

Attest:

DOUGLAS B. COMER

*Attesting Officer*       *Acting Commissioner of Patents and Trademarks*